United States Patent [19]

Verboom et al.

[11] Patent Number: 4,930,115
[45] Date of Patent: May 29, 1990

[54] METHOD OF AND DEVICE FOR RECORDING INFORMATION, RECORD CARRIER, AND DEVICE FOR READING THE RECORDED INFORMATION

[75] Inventors: Johannes J. Verboom, Colorado Springs, Colo.; Constant P. M. J. Baggen, Baarlo, Netherlands; Cornelis M. J. Van Uijen; Erik W. Gaal, both of Eindhoven, Netherlands

[73] Assignee: U.S. Philips Corp., New York, N.Y.

[21] Appl. No.: 190,558

[22] Filed: May 5, 1988

[30] Foreign Application Priority Data

Dec. 3, 1987 [NL] Netherlands ............... 8702903

[51] Int. Cl.⁵ .................. H04N 5/76; G11B 5/09
[52] U.S. Cl. ........................ 369/59; 368/40
[58] Field of Search ............ 360/39, 40; 341/50, 341/59, 97, 98; 369/59

[56] References Cited

U.S. PATENT DOCUMENTS

| | | | |
|---|---|---|---|
| 4,155,076 | 5/1976 | Rockett Jr. ............... | 341/97 |
| 4,484,176 | 11/1984 | Fitzpatrick ............... | 360/40 |
| 4,586,025 | 4/1986 | Knierim .................. | 341/97 |
| 4,677,421 | 6/1987 | Taniyama ................. | 360/40 |
| 4,695,993 | 9/1987 | Takagi et al. ............ | 369/59 |

FOREIGN PATENT DOCUMENTS 0145934 7/1986 Japan ............................ 341/59

OTHER PUBLICATIONS

IBM TDB, "Encoding Scheme with No Clock Transitions and Restricted Accumulated DC Content", Rooney, J. A., vol. 21, No. 4, Sept. 1978, pp. 1600–1604.

Primary Examiner—Vincent P. Canney
Attorney, Agent, or Firm—Emmanuel J. Lobato

[57] ABSTRACT

A method of and device for recording an information signal (Vc) on a record carrier (1) are revealed. The information words of the information signal are converted into code words (200) comprising a variable number of bits of a first logic value ("1"). The number of consecutive bits of the first logic value is at least equal to P. the number of consecutive bits of the second logic value ("0") is at least Q, P being an integer greater than or equal to 1 and Q being an integer greater than P. the code words are selected in such a way that for information words of successive values the associated code words differ for only one bit. During recording an elementary mark (54) is formed on the record carrier for every bit of the first logic value. Moreover a read device for the record carrier thus obtained is described.

15 Claims, 20 Drawing Sheets

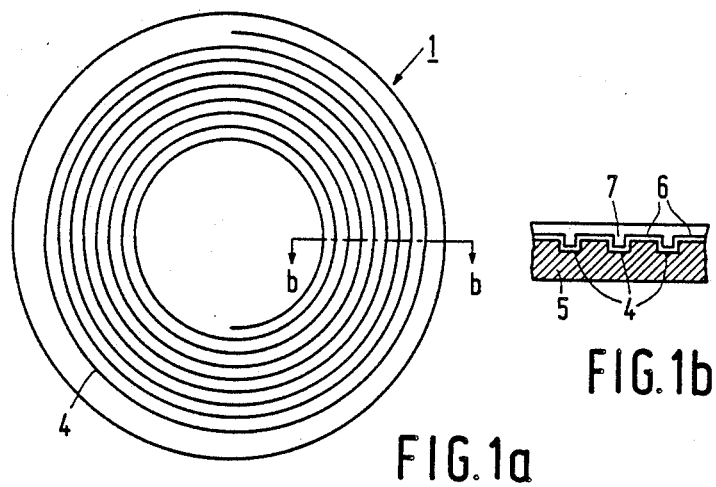
FIG.1b
FIG.1a
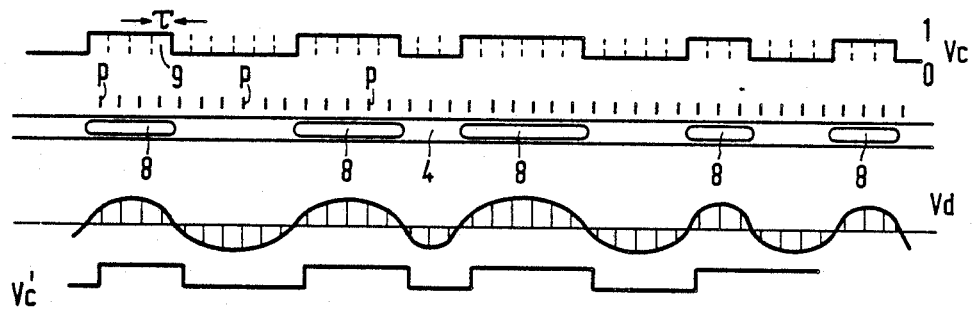
FIG.2
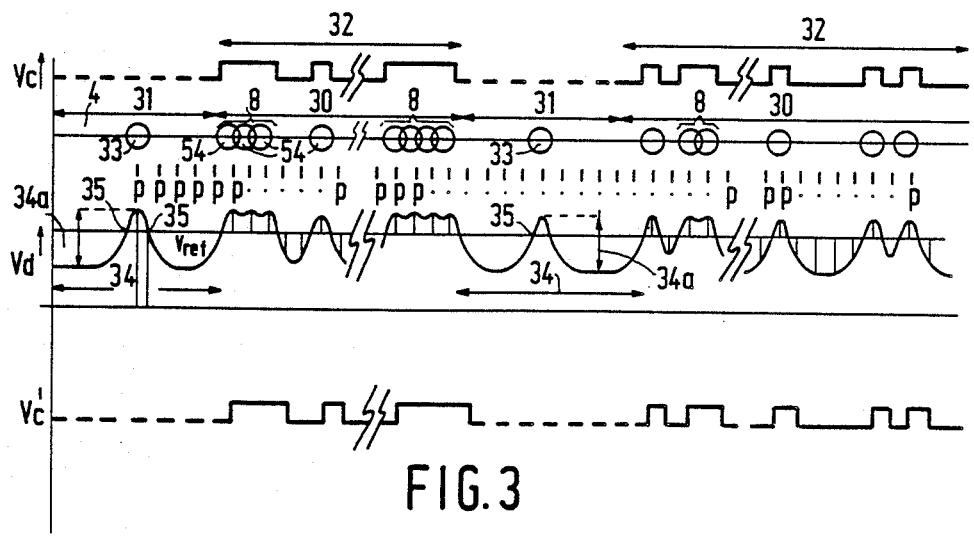
FIG.3

FIG. 13 (I)

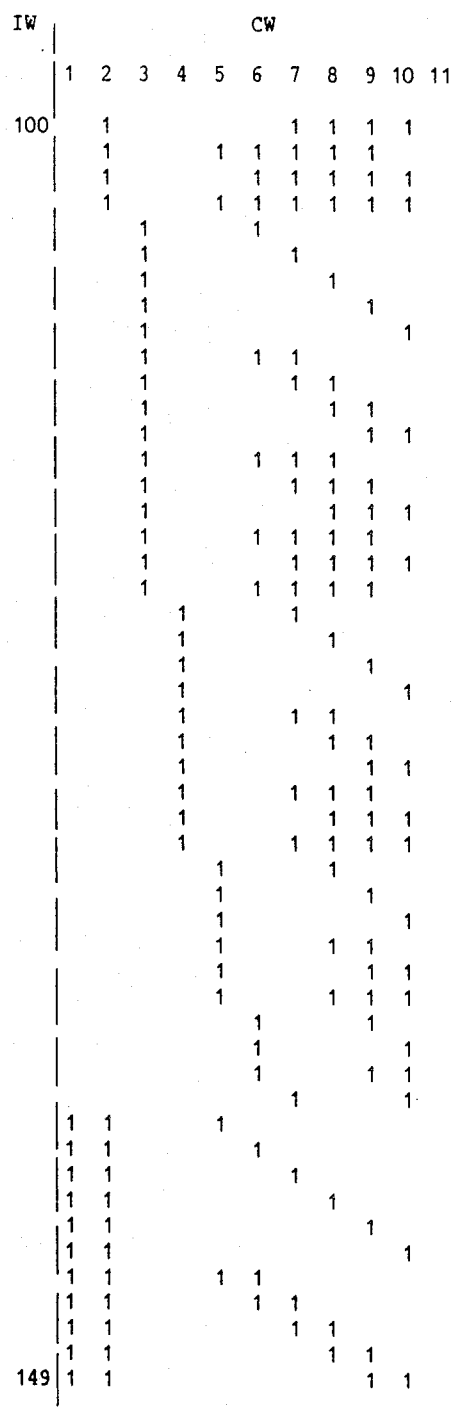
FIG. 13 (II)

FIG. 13(III)

FIG. 14(III)

FIG. 15(III)

| IW | CW 1 | 2 | 3 | 4 | 5 | 6 | 7 | 8 | 9 | 10 | 11 |
|---|---|---|---|---|---|---|---|---|---|---|---|
| 150 | 1 |   |   |   | 1 | 1 |   |   |   |   |   |
|  | 1 |   |   |   | 1 | x | 1 |   |   |   |   |
|  | 1 |   |   |   | 1 | x | 1 | 1 |   |   |   |
|  | 1 |   |   |   | 1 | x | 1 |   |   |   |   |
| 154 | 1 |   |   |   | 1 | x | 1 | 1 |   |   |   |
|  | 1 |   |   |   |   | 1 | x | 1 |   |   |   |
|  | 1 |   |   |   |   | 1 | x | 1 | 1 |   |   |
|  | 1 |   |   |   | 1 | x | 1 | x | 1 |   |   |
| 159 | 1 |   |   |   | 1 | x | 1 | x | 1 | 1 |   |
| 1 | 1 |   |   |   | 1 | x | 1 | x | 1 |   |   |
| 1 | 1 |   |   |   | 1 | x | 1 | x | 1 | 1 |   |
| 1 | 1 |   |   |   |   | 1 | x | 1 | x | 1 |   |
| 1 | 1 |   |   |   |   | 1 | x | 1 | 1 |   |   |
| 164 | 1 | 1 |   |   |   |   | 1 | x | 1 |   |   |
| 1 | 1 |   |   |   | 1 | x | 1 | 1 |   |   |   |
| 1 | 1 |   |   |   | 1 | x | 1 |   |   |   |   |
| 1 | 1 |   |   | 1 | x | 1 | 1 |   |   |   |   |
| 1 | 1 |   |   | 1 | x | 1 |   |   |   |   |   |
| 169 | 1 | 1 |   |   | 1 | 1 |   |   |   |   |   |
| 1 | 1 |   |   |   | 1 |   |   |   |   |   |   |
| 1 | 1 |   |   |   | 1 | 1 |   |   |   |   |   |
| 1 | 1 |   |   |   |   | 1 |   |   |   |   |   |
| 1 | 1 |   |   |   |   | 1 | 1 |   |   |   |   |
| 174 | 1 | 1 |   |   |   |   | 1 |   |   |   |   |
| 1 | 1 |   |   |   |   | 1 | 1 |   |   |   |   |
| 1 | 1 |   |   |   |   |   | 1 |   |   |   |   |
| 1 | 1 |   |   |   |   |   | 1 | 1 |   |   |   |
| 1 | 1 |   |   |   |   |   |   | 1 |   |   |   |
| 179 | 1 |   |   |   |   |   |   | 1 |   |   |   |
| 1 |   |   |   |   |   |   |   | 1 | 1 |   |   |
| 1 |   |   |   |   |   |   |   | 1 |   |   |   |
| 1 |   |   |   |   |   |   | 1 | 1 |   |   |   |
| 1 |   |   |   |   |   |   | 1 |   |   |   |   |
| 184 | 1 |   |   |   |   | 1 | 1 |   |   |   |   |
| 1 |   |   |   |   |   | 1 |   |   |   |   |   |
| 1 |   |   |   |   | 1 | 1 |   |   |   |   |   |
| 1 |   |   |   |   | 1 |   |   |   |   |   |   |
| 1 |   |   |   | 1 | 1 |   |   |   |   |   |   |
| 189 | 1 |   |   | 1 | x | 1 |   |   |   |   |   |
| 1 |   |   |   | 1 | x | 1 | 1 |   |   |   |   |
| 1 |   |   |   |   | 1 | x | 1 |   |   |   |   |
| 1 |   |   |   |   | 1 | x | 1 | 1 |   |   |   |
| 1 |   |   |   |   |   | 1 | x | 1 |   |   |   |
| 194 | 1 |   |   |   |   | 1 | x | 1 | 1 |   |   |
| 1 |   |   |   |   |   |   | 1 | x | 1 |   |   |
| 1 |   |   |   |   |   |   | 1 | x | 1 | 1 |   |
| 1 |   |   |   |   |   |   |   | 1 | x | 1 |   |
| 1 |   |   |   | 1 |   |   |   | 1 | x | 1 |   |
| 199 | 1 |   |   |   | 1 |   |   | 1 | x | 1 | 1 |

| IW | CW 1 | 2 | 3 | 4 | 5 | 6 | 7 | 8 | 9 | 10 | 11 |
|---|---|---|---|---|---|---|---|---|---|---|---|
| 200 | 1 |   |   |   | 1 |   |   | 1 | x | 1 |   |
|  | 1 |   |   |   | 1 |   |   | 1 | 1 |   |   |
|  | 1 |   |   |   | 1 |   |   |   | 1 |   |   |
|  | 1 |   |   |   | 1 |   |   |   | 1 | 1 |   |
|  | 1 |   |   |   | 1 |   |   |   |   | 1 |   |
|  | 1 |   |   |   | 1 |   |   |   | 1 | 1 |   |
|  | 1 |   |   |   | 1 |   |   |   |   | 1 |   |
|  | 1 |   |   |   | 1 | 1 |   |   |   | 1 |   |
|  | 1 |   |   |   | 1 | 1 |   |   | 1 | 1 |   |
|  | 1 |   |   |   | 1 | 1 |   |   | 1 |   |   |
|  | 1 |   |   |   | 1 | 1 |   | 1 | 1 |   |   |
|  | 1 |   |   |   |   | 1 |   |   | 1 |   |   |
|  | 1 |   |   |   |   | 1 |   |   | 1 |   |   |
|  | 1 |   |   |   |   | 1 |   |   | 1 | 1 |   |
|  | 1 |   |   |   |   | 1 |   |   |   | 1 |   |
|  | 1 |   |   |   |   | 1 |   |   | 1 | 1 |   |
|  | 1 |   |   |   |   | 1 |   |   |   | 1 |   |
|  | 1 |   |   |   |   | 1 | 1 |   |   | 1 |   |
|  | 1 |   |   |   |   | 1 | 1 |   |   | 1 | 1 |
|  | 1 |   |   |   |   | 1 | 1 |   |   |   | 1 |
|  | 1 |   |   |   |   | 1 |   | 1 | 1 |   |   |
|  | 1 | 1 |   |   |   | 1 |   | 1 |   |   |   |
|  | 1 | 1 |   |   |   | 1 | 1 |   |   |   |   |
|  | 1 | 1 |   |   |   | 1 |   |   |   |   |   |
|  | 1 | 1 |   |   |   | 1 |   |   | 1 | 1 |   |
|  | 1 | 1 |   |   |   | 1 |   |   |   | 1 |   |
|  | 1 | 1 |   |   | 1 | 1 |   |   | 1 | 1 |   |
|  | 1 | 1 |   |   | 1 | 1 |   |   |   | 1 |   |
|  | 1 | 1 |   |   |   | 1 |   |   | 1 | 1 |   |
|  | 1 | 1 |   |   |   | 1 |   |   |   | 1 |   |
|  | 1 | 1 |   |   |   | 1 |   | 1 | 1 |   |   |
|  | 1 | 1 |   |   |   | 1 |   | 1 |   |   |   |
|  | 1 |   |   |   |   | 1 |   |   | 1 |   |   |
|  | 1 |   |   |   |   | 1 |   |   | 1 |   |   |
|  | 1 |   |   |   |   | 1 |   |   | 1 | 1 |   |
|  | 1 |   |   |   |   | 1 |   |   |   | 1 |   |
|  | 1 |   |   |   | 1 | 1 |   |   | 1 |   |   |
|  | 1 |   |   |   | 1 | 1 |   |   |   | 1 |   |
|  | 1 |   |   |   | 1 | 1 |   |   | 1 | 1 |   |
|  | 1 |   |   |   |   | 1 |   |   |   | 1 |   |
|  | 1 |   |   |   |   | 1 |   |   | 1 |   |   |
|  | 1 |   |   |   |   | 1 |   |   | 1 | 1 |   |
|  | 1 |   |   |   |   | 1 |   |   |   | 1 |   |
|  | 1 |   |   |   |   | 1 |   |   | 1 |   |   |
|  | 1 |   |   |   |   | 1 |   |   |   | 1 |   |
|  | 1 |   |   |   |   | 1 |   |   | 1 | 1 |   |
|  | 1 |   |   |   |   | 1 |   |   |   | 1 |   |
|  | 1 |   |   |   |   | 1 |   |   |   | 1 |   |
| 249 | 1 |   |   |   |   | 1 | 1 |   |   | 1 |   |
| 250 | 1 |   |   |   |   |   | 1 |   |   | 1 |   |
|  | 1 | 1 |   |   |   |   | 1 |   |   | 1 |   |
|  | 1 | 1 |   |   |   | 1 | 1 |   |   | 1 |   |
|  | 1 | 1 |   |   |   | 1 |   |   |   | 1 |   |
|  | 1 |   |   |   |   | 1 |   |   |   | 1 |   |
| 255 |   | 1 |   |   |   | 1 |   |   |   |   |   |

METHOD OF AND DEVICE FOR RECORDING INFORMATION, RECORD CARRIER, AND DEVICE FOR READING THE RECORDED INFORMATION

BACKGROUND OF THE INVENTION

The invention relates to a method of recording an information signal on a record carrier, an information signal being converted into a code signal comprising code words made up of bits, the number of successive bits of a first logic & value within the code word being at least equal to P, the number of successive bits of the second logic value within each code word, which are situated between the groups of at least Pbits of the first logic value, being at least equal to Q, P being an integer greater than or equal to 1 and Q being an integer greater than P, in which method an information pattern of recording marks corresponding to the code signal is formed on the record carrier, in which pattern the bits of the first logic value are represented by the recording marks.

The invention further relates to a record carrier with an information track in which information is recorded as an information pattern of recording marks, the information pattern comprising code symbols which represent code words, which code symbols have substantially equidistant symbol positions, a number of said positions being occupied by a recording mark, the number of consecutive occupied symbol positions being at least equal to P, the number of consecutive occupied symbol positions situated between the groups of at least P occupied symbol positions within the code symbols being at least equal to Q, P being an integer greater than or equal to 1 and Q being greater than P.

The invention also relates to a device for recording information on a record carrier, which device comprises an encoding circuit for converting the information signal into a code signal comprising code words, the number of consecutive bits of a first logic value in each code word being at least equal to P, and the number of consecutive bits of a second logic value within each code word, situated between the groups of at least P bits of the first logic value, being at least equal to Q, where P is an integer greater than or equal to 1 and Q is an integer greater than P, the device comprising drive means for moving the record carrier relative to the write means, which are adapted to form an elementary mark in response to a bit of the first logic value.

The invention moreover relates to a device for reading a record carrier on which an information signal is recorded as an information pattern of recording marks, which device comprises read means for scanning the information pattern and for generating a detection signal which is representative of the pattern being scanned, means for converting the detection signal into a code signal comprising code words, which code words are made up of bits of a first logic value and bits of a second logic value, and a decoding circuit converting the code signal into an information signal.

Such a method and such devices are known inter alia from British Patent Specification G.B. 2,148,670 (OSI 805). In the method and recording device described therein 8-bit information words, which constitute the information signal, are converted into 15-bit code words in which the number of successive "O" bits is at least two.

During reading the information pattern of recording marks is scanned by a laser beam, the reflected or transmitted laser beam being modulated by the information pattern being scanned. An optical detector detects the modulated laser beam, the detector generating a detection signal whose signal strength corresponds to the degree of modulation of the laser beam. Subsequently, the code signal is recovered from the detection signal by differential detection. In order to enable differential detection the code words should meet the additional requirement that during recording the number of "1" bits per code word is four for every code word. In that case every code word can be recovered reliably from the portion of the detected signal corresponding to the code word by differential detection. This is effected by selecting the four detection instants of most extreme signal strength.

SUMMARY OF THE INVENTION

It is an object of the invention to provide a recording method and a recording device, enabling the information signal to be recorded so as to obtain a higher information density to be obtained on a record carrier and so as to maintain a reliable read-out of the record carrier.

With respect to the method this object is achieved in that the number of bits of the first logic value is code-word dependent, information words of consecutive values being converted into code words whose logic value is different for only one bit.

With respect to the device this object is achieved by an encoding circuit is adapted to generate code words with a variable number of bits of the first logic value, the logic values being different at only one bit position in the code words corresponding to information words of consecutive values.

The invention is based inter alia on the recognition of the fact that if the requirement of a constant number of "1" bits per code word is abandoned, the number of code word bits required can be reduced substantially without the reliability of the read process being affected, provided that level detection is used instead of differential detection. In such level detection the detection signal is compared with a decision level at substantially equidistant instants. The logic value of the recovered bit of the code signal is then dictated by the result of the comparison. Moreover, by abandoning the above requirement it is possible to select the code words in such a way that for information words of consecutive values the code words differ by one bit only. This is an advantage in particular in the case of a disc-shaped record carrier divided into sectors, the track addresses being arranged at the beginnings of the sectors in the form of radially adjoining address-code symbols. When the address information is recorded in accordance with the inventive method it is possible to reliably read a desired track address, in the case of the track addresses passed during radial displacements of the read head to a track specified by a desired address, because the influence of crosstalk between radially adjacent address-code symbols is minimal as a result of the minimal difference between the address-information patterns of successive tracks.

The address-information patterns are often preceded by control symbols which can be distinguished from the information patterns. In order to minimise the track space occupied by the control symbols, it is desirable to minimize the length of the control symbols. Moreover, it is desirable that the control patterns can be detected simply. This is possible by means of an embodiment of the method which is characterized by the code words being selected in such a way that the number of successive bits of the second logic value at the boundaries is smaller than S/2, S being the number of code word bits.

This makes it possible to select a control symbol comprising at least two recording marks whose spacing from one another need only be slightly larger than the number of bits in the code word. During detection it is adequate to determine the spacing between two recording marks in the control symbol.

A further embodiment of the method is characterized in that Q is two and S is eleven, and in that the number of successive bits of the second logic value at both boundaries is four at the most, the number of bits of the second logic value at a predetermined boundary of the code word being always at least one.

In this embodiment the bit situated nearest the predetermined code word boundary always has the second logic value. In fact, this bit does not contain any information but serves as a merging bit. During decoding this bit may therefore be ignored completely. The advantage of such a merging bit is that in a sequence of consecutive code words one bit of the second logic value out of the other ten bit positions of the code words always forms part of group of at least two consecutive bits of the second logic value, and that for these bits said criterion (Q=2) is met. As a result of the requirements imposed the number of consecutive bits of the second logic value is eight at the most.

As a result of the requirements imposed on the boundaries of the code words the number of consecutive bits of the second logic value at the code word boundary transition is also eight at the most. This means that a very short control mark can be selected.

Recording is often effected by means of a radiation source which for every logic bit of the first logic value produces a radiation pulse to form the recording mark. In order to extend the life of the radiation source it is desirable to select such a code that the number of radiation pulses needed for recording is minimized. This is achieved in an embodiment of the recording method, in which an information signal is converted into a code signal comprising code words made up of bits of a first logic value and bits of a second logic value, a pattern of recording marks corresponding to the code signal being formed on the record carrier, in which pattern bits of the first logic value are represented by the recording marks, characterized in that the code words are selected from a group of code words obtained in that in code words in which groups of P or more bits of the first logic value are separated by at least Q bits of the second logic value, groups of at the most T bits of the first logic value, which groups are bounded at both ends by P bits of the first logic value are replaced, by a group of T bits of the second logic value, P being an integer greater than or equal to 1, Q being an integer greater than P, and T being an integer smaller than Q.

The information thus recorded can be read with a read device as defined in the foregoing, which is characterized in that the decoding signal is adapted to decode code words in which a bit pattern of a group which is bounded at both ends by P bits of a first logic value and which comprises at the most T consecutive bits of the second logic value in a way identical to a code word in which said group of T bits of the second logic value is replaced by T bits of the first logic value and in which the logic values of the other bits are identical, T being an integer greater than or equal to 1.

A further embodiment of the read device is characterized in that the decoding circuit comprises a modification circuit for modifying the code signal, for which purpose the modification circuit comprises detection means for detecting the presence of said groups of at the most T bits in the code words and means responsive to the detection of the presence of said group of at the most T bits to change the logic values of the bits of said group into the first logic value, the decoding circuit further comprising a code converter for converting the code words of the modified code signal into information words. In comparison with the preceding embodiment this embodiment has the advantage that the number of code words to be decoded is reduced.

Another embodiment of the recording method is characterized in that at retraceable positions on the record carrier and outside the area used for recording the information signal freely situated reference marks are formed, which reference marks are of the same type as the recording marks.

This embodiment enables the decision level to be derived from the detection signal in a reliable manner. When the information signal thus recorded is read the decision level can be derived simply from that portion of the detection signal which corresponds to the freely situated reference marks. When such a method of deriving is used, changes in parameters, such as the intensity of the radiation beam, the reflection coefficient of the record carrier etc., will hardly affect the reliability of the read process.

Yet another embodiment of the recording method is characterized in that the record carrier is provided with a preformed pattern of information tracks, the information track being provided with control symbols which can be distinguished from the pattern of recording marks to be formed, the reference marks being arranged at predetermined positions relative to the control symbols.

This embodiment has the advantage that the reference marks are easy to locate.

BRIEF DESCRIPTION OF THE DRAWING

Further embodiments and advantages thereof will now be described in more detail, by way of example, with reference to FIGS. 1 to 21, of which FIG. 1a and b show an optically inscribable record carrier, FIGS. 2 and 3 show, for different recording systems, a code signal Vc, the pattern of recording marks on the record carrier which represent said code signal, the detection signal Vd obtained when the record carrier is read, and the code signal Vc' revovered from the recording signal.

FIGS. 13, 14, 15I through III of each and 21a through e, by way of example, illustrate the relationships between the information words IW and the code words CW for different embodiments of the method in accordance with the invention, FIG. 16a and b for an arbitrary code word, give corresponding code symbols, detection signals and code words recovered from the detection signal after reading for different spacings between the symbol positions.

DETAILED DESCRIPTION OF THE INVENTION

Figure 4:
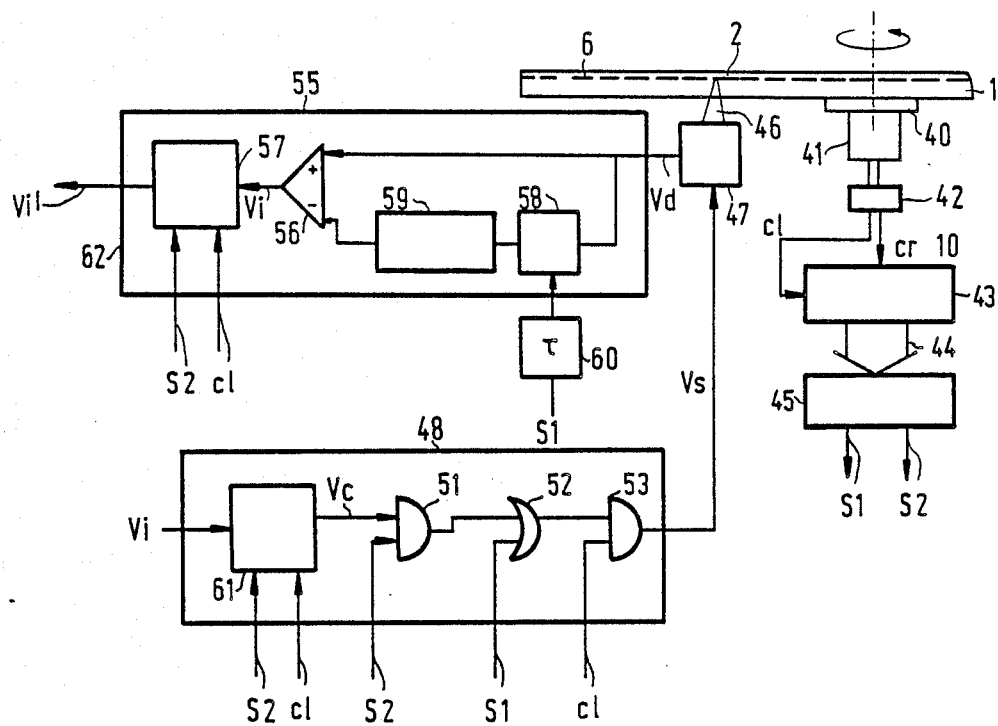
FIG. 4, 4a and 4b show an embodiment of the read and write device.

FIG. 1a shows a disc-shaped record carrier 1 provided with a preformed pattern of tracks 4.

Such a track pattern may comprise, for example, a preformed spiral groove in a substrate 5. In FIG. 1b, which shows a part of the sectional view of the record carrier 1 taken on the line b—b, these grooves are shown to a strongly enlarged scale. The substrate 5 is covered with a radiation-sensitive layer 6 of a customary type which, if exposed to radiation of a sufficiently high energy content, is subjected to an optically detectable change. Such a layer 6 may consist of, for example, a tellurium alloy, which by exposure to a radiation beam can be heated locally in such a way that the layer is removed at the location of heating.

The layer 6 may alternatively consist of a "phase-change" material, which upon heating by a radiation beam is subjected to a change in structure, for example a change from an amorphous to a crystalline structure or vice versa.

Alternatively, the layer 6 may consist of a magneto-optical material whose direction of magnetisation can be changed by influencing the layer by applying a magnetic field and at the same time locally heating the magneto-optical material by means of a radiation beam. The layer 6 is covered with a protective coating 7.

The track pattern shown in FIG. 1 comprises a continuous groove. However, such a track pattern may also be constituted exclusively by, for example, servo-control symbols situated at equidistant angular positions, which symbols define the position of the track to be used for recording.

An information signal can be recorded in the track 4 by scanning the track 4 with a radiation beam and modulating the beam in such a way that a pattern of recording marks representative of the information signal is formed in the track. For this purpose it is common practice to convert the information signal into a binary code signal and subsequently to modulate the radiation beam in conformity with the code signal, yielding a pattern of recording marks such that portions of the code signal of a first logic value, for example "1", in the pattern correspond to portions of the track occupied by recording marks and portions of an other logic value, for example "0", correspond to the unoccupied track portions.

FIG. 2 shows patterns of recording marks 8 and the corresponding code signal Vc obtained as described above.

Said code signal Vc comprises bit cells 9 of constant length $\tau$. The centres of the bit cells 9 correspond to equidistant symbol positions, indicated by the letter p in FIG. 2. The code signal Vc can be read from the track 4 by scanning the track 4 with a radiation beam and subsequently detecting the modulation produced in the reflected beam by the pattern of recording marks 8 by means of an optical detector of a customary type, which detector generates a detection signal Vd of a signal strength corresponding to the modulation of the radiation beam produced during scanning. The detection signal Vd thus obtained is also shown in FIG. 2. A code signal Vc' identical to the original code signal Vc is recovered from the detection signal Vd by comparing the detection signal Vd with a decision level Vref at the instants at which the center of the radiation beam corresponds to the symbol positions p. The logic value of the recovered code signal Vc depends on the result of the comparison. In order to enable the reference level to be derived simply from the detection signal Vc it is customary to utilize a d.c. limited code. The d.c. component in the detection signal may then be employed as the decision level.

The requirements to be imposed on the code in order to obtain this d.c. limitation make this code less suitable for use in systems in which digital information is to be recorded at random locations on the record carrier, as is generally desirable in computer applications.

Referring now to FIG. 3, a method of recording and reading in accordance with the invention will be described, which enables the decision level to be recovered from the detection signal Vd in a simple and reliable manner and which does not impose any restrictions on the code.

In the track 4 shown in FIG. 3 portions 30, representative of portions 32 of the code signal Vc, alternate with portions 31 in which a reference mark 33 is formed. The reference marks 33 are formed in the layer 6 by means of a radiation beam in the same way as the recording marks 8, so that they have the same modified optical properties as the recording marks 8, which in the FIGURE comprise one or more elementary marks 54. These elementary marks are the smallest possible marks that can be formed by the recording device used.

When the track 4 is read the reference level is derived from that portion of the detection signal Vd which corresponds to the reference mark 33, for example by selecting a reference level which is equal to a predetermined percentage of the difference 34a between the minimum and the maximum value of the detection-signal portion 34.

An other suitable value for the reference level is the signal strength of the detection signal at the instant at which the spacing between the center of the radiation beam and the center of the reference mark 33 is equal to half the spacing between the symbol positions p. In FIG. 3 these values bear the reference numeral 35.

In order to enable the reference level Vref to be derived, it is necessary to provide the reference marks 33 at retraceable positions. If a disc-shaped record carrier is used this can be achieved, for example, by arranging the reference marks at predetermined angular positions. In the case of a record carrier provided with preformed optically detectable control symbols which can be distinguished from the patterns of recording marks as formed during information recording, the reference marks 33 are preferably situated at predetermined positions relative to these control symbols.

In the method described in the foregoing the reference level is derived from the detection signal. This has the advantage that the intensity of the radiation beam and the properties of the material of the layer 6, for example the reflection coefficient, do not influence the reliability of the recovery of the code signal Vc'.

FIG. 4 shows an embodiment of a recording and read device in accordance with the invention. In the present embodiment the record carrier 1 is fixed onto a turntable 40. The turntable 40 is driven by drive motor 41 which is mechanically coupled to a pulse generator 42 for generating a pulse-shaped clock signal cl whose frequency is proportional to the angular velocity of the record carrier 1.

The period of the clock pulses of the clock signal corresponds to the spacing between the symbol positions p. The pulse generator 42 further comprises customary means for generating one reset pulse cr every revolution. The clock signal cl is applied to a cyclic counter 43 for counting the pulses of the clock signal cl. The counter range of the cyclic counter 43 is selected so as to obtain an integral number of counter cycles in one complete revolution of the disc. In the present embodiment the counter range is "65". The reset pulse cr is applied to a reset input of the counter 43 to set the counter 43 to zero. The count of the counter 43 is transferred to a gate circuit 45 via a bus 44, which gate circuit generates a signal S2 of a logic value "1" for the counts "6" to "65" and a signal S1 of a logic value "1" during the time that the count of the counter 43 is "3". The gate circuit 45 may comprise conventional comparator circuits, which compare the count with a desired count and which supply the result of the comparison in the form of a logic signal. However, it is also possible to use other circuits, for example a read-only memory (ROM) or a programmable logic array (PLA).

An optical read/write head 47 of a customary type is arranged opposite the rotating record carrier 1 to scan the track 4 by means of a radiation beam 46. The read/write head 47 comprises beam-modulating means for modulating the beam in conformity with a write signal Vs supplied by a write circuit 48 to form the pattern of recording marks in the track 4.

The write circuit 48 comprises an encoding circuit 61 for converting the binary information signal Vi into the code signal Vc. The encoding circuit, which is shown in detail in FIG. 4a, comprises a serial-parallel converter 62 to form m-bit information words, for example 8-bit information words. By means of a memory 63, for example a ROM, the m-bit information words are converted into n-bit code words, for example 12-bit code words. The n-bit code words are converted into the serial code signal Vc by means of a parallel-serial converter 64.

In order to control the conversion process the encoding circuit 61 comprises a control circuit 65 which is adapted to generate clock signals c12 and c13, which are derived from the clock signal cl in a customary manner. The control circuit 65 is dimensioned in such a way that the frequency of the clock signal c12, which is applied to the clock input of the serial-parallel converter 62 via a two-input AND-gate 66, is equal to m/n times the frequency of the clock signal cl.

The frequency of the clock signal c13, which is applied to the parallel load input of the parallel-serial converter 64 via the two-input AND-gate 67, is equal to 1/n times the frequency of the clock signal cl. The clock signal cl is applied to the clock input of the parallel-serial converter 64 via a two-input AND gate 68. Moreover, the signal S2 is applied to the inputs of the AND gates 66, 67 and 68, so that during the counts "6" to "65" the clock signals cl, c12 and c13 are transferred to the converters 62 and 64 and during the counts "1" to "5" the clock signals c1, c12 and c13 are inhibited by the gates 66, 67 and 68. Thus, during scanning of the symbol position p6 to p65 the information signal Vi is converted into the code signal Vc and during scanning of the symbol positions p1 to p5 conversion is discontinued.

Figure 5:
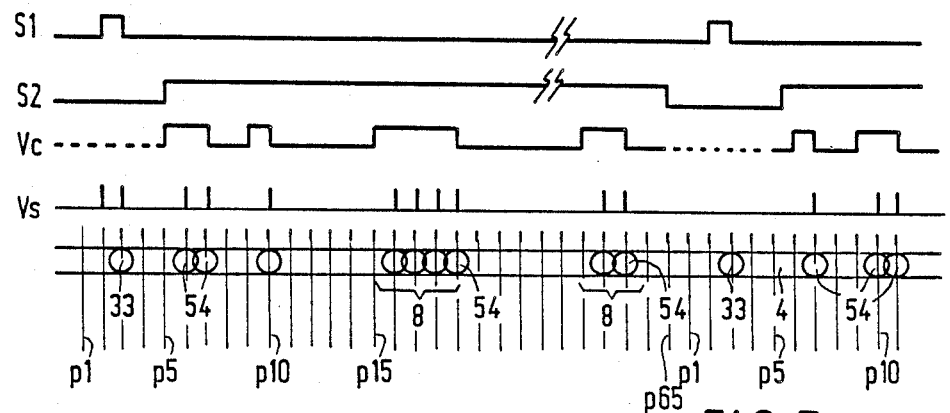
FIG. 5 shows a number of signal waveforms appearing in the device of FIG. 4, FIG. 6A and B show another embodiment of an optically inscribable record carrier.

The code signal Vc is applied to one of the inputs of a two-input AND gate 51 and the signal S2 is applied to the other input of the AND-gate 51, so that the code signal Vc is only transferred to the output of the AND gate 51 while the symbol positions p6 to p65 are scanned. The output of the AND gate 51 is applied to one of the inputs of the two-input AND gate 53 via an OR gate 52. The pulse-shaped clock signal C1 is applied to the other input of the AND gate 53, so that for each code bit of the logic "1" value one pulse of the clock signal is transferred to the output of the AND gate 53 (see FIG. 5). The output signal of the AND gate 53 functions as the write signal Vs for the write head 47. In response to every pulse of the write signal Vs the write head 47 produces a radiation pulse to expose the layer 6 over an area corresponding to the diameter of the radiation beam and thereby produce an optically detectable change in this area. These areas constitute the elementary marks 54. As is apparent from FIG .5, all the recording marks thus formed comprise one or more of these elementary marks 54.

When the count "1" is reached the flow of code-word bits at the output of the encoding circuit 61 is temporarily interrupted in response to a 1-0 transition in the signal S2 until the count "6" is reached again and the signal S2 becomes "1" again. When the count "3" is reached the signal S1 becomes "1". As this signal is also applied to the AND gate 53 via the OR gate 52, a clock pulse of the clock signal cl is transferred to the read/write head 47 for the count "3", so that for every count "3" an elementary mark 54 is recorded in the track 4, which mark functions as a reference mark 33.

If the track 4 is to be read, the read/write head 47 can be set to the read mode, in which mode the intensity of the radiation beam 46 is maintained at a constant value which is inadequate to produce a change in the layer 6. The read/write head 47 comprises an optical detector for detecting the modulation produced in the reflected beam by the pattern of recording marks 8 in the track 4 and for generating a detection signal Vd of a signal strength corresponding to this modulation. The detection signal Vd is applied to a read circuit 55. The read circuit 55 comprises a comparator 56 having a non-inverting input to which the detection signal Vd is applied and having an inverting input to which a reference signal whose voltage level corresponds to the decision level Vref is applied.

Figures 4A, 4B:
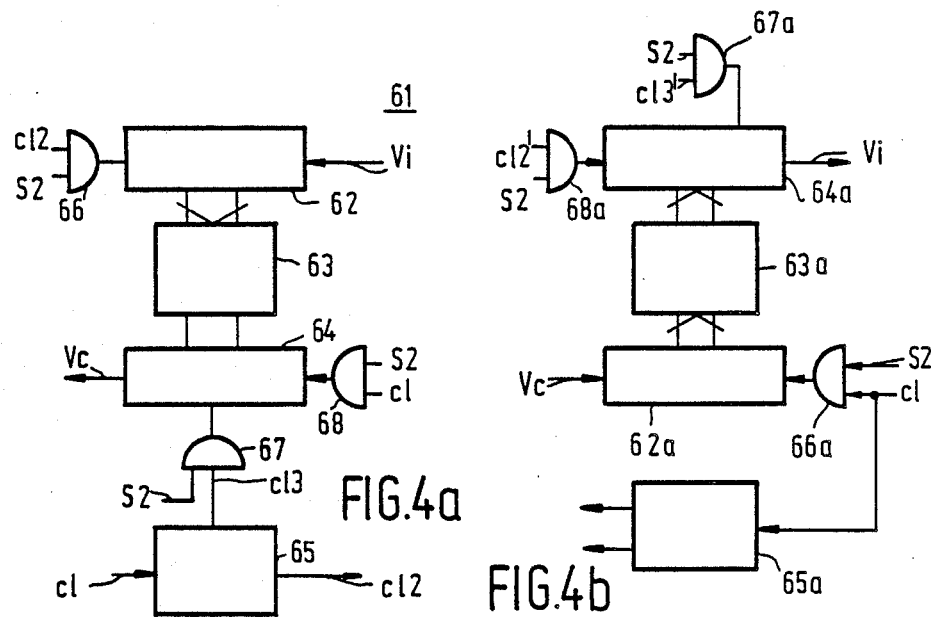

The output of the comparator 56 is applied to a serial data input of a serial-parallel converter 62a of a decoding circuit 57 (see FIG. 4b). The serial-parallel converter 62a is controlled by the clock signal cl, which is applied to the clock input of the converter 62a via a two-input AND gate 66a. The signal S2 is also applied to the AND gate 66a, so that the output signal of the comparator 56 is read into the converter 62a only during the time that this output signal is representative of the recovered code signal Vc'. The signal on the output of the comparator 56 is thus converted into n-bit code words, which are converted into m-bit information words by means of a memory 63a, for example a ROM. In response to the clock signal C12', which is applied via a two-input AND gate 68a, the m-bit information words are read into a parallel-serial converter 64a.

The m-bit information words thus read in are converted into the serial binary information signal Vi' under the control of a clock signal c13', which is applied to the clock input of the converter 64a via a two-input AND gate 67a. The signal S2 is also applied to the gates 67a and 68a, so that conversion is discontinued during the time interval in which S2 indicates that the symbol positions p1 to p5 are being scanned. The clock signals c12' and c13' are derived from the clock signal cl in a customary manner by means of a control circuit 65a, which is dimensioned in such a way that the frequencies of the clock signals c12' and c13' are equal to m/n times and 1/n times the frequency of the clock signal cl respectively.

For the purpose of deriving the reference signal the read circuit 55 comprises a sample-and-hold circuit 58 for sampling the detection signal at instants at which the center of the beam 46 has reached a position which is situated at a distance beyond the center of the reference mark 33 which corresponds to substantially half the spacing between the symbol positions. The control signal for the circuit 58 can be derived from the signal S1 by delaying the signal S1 by a time corresponding to half the spacing between the symbol positions by means of a delay circuit 60. The level of the output signal of the circuit 58 can be used as the decision level Vref. Suitably, the output signal of the circuit 58 is applied to the comparator 56 via a low-pass filter 59.

The output signal of the low-pass filter 59 is a measure of the weighted mean of the samples of the detection signal, the influence of the reference marks on the output signal diminishing as scanning of the reference mark took place earlier. The advantage of such an averaging is that the influence of an incorrectly recorded or read reference mark on the reference level is minimal. It will be appreciated by those skilled in the art that averaging can be achieved by numerous other methods than by means of a low-pass filter, for example by means of a microcomputer loaded with a suitable averaging program.

It is to be noted that there are various other ways of deriving the decision level from the detection-signal portions obtained during scanning of the reference marks 33. For example, the signal value of the flat portion of the detection signal Vd just before or just after scanning of the reference area can be sampled by means of a first sample-and-hold circuit. Subsequently, the maximum signal value during scanning of the center of the reference mark 34 can be determined by means of a second sample-and-hold circuit. The difference between the output signals of the sample-and-hold circuits indicates the height of the signal peak produced in the detection signal Vd by the reference mark 34. The decision level can be derived from this peak height by multiplying the signal value of the peak height by a specific factor. Since the spacing between the symbol positions depends on the radius (the record carrier rotates with a constant angular velocity) and hence the magnitude of the eye opening of the eye pattern dictated by the detection velocity, it is desirable to make said multiplication factor dependent upon the radius in order to obtain an optimum decision level (i.e. the centre of the smallest eye opening), in such a way that the decision level is adjusted to a higher value as the spacing between the symbol positions decreases, i.e. as the track to be read is situated closer to the disc center.

This can be achieved, for example, by arranging a multiplier in the signal path between the output of the filter 59 and the comparator 56, to multiply the output signal of the low-pass filter by a radius-dependent value which can be derived from the radial position of the read/write head 47 in a customary manner by means of a position detector.

It is to be noted that if the decision level is derived from the detection-signal value at the instant at which the scanning beam is situated at half the symbol-position spacing, the desired decision level in the case of very high information densities should be higher than the detected value as a result of inter-symbol interference. In the case of a disc-shaped record carrier it is then also desirable to apply a radius-dependent correction to the level thus detected.

It is to be noted also that in principle the radius-dependent adaptation is not necessary if the decision level is adjusted to a value suitable for the minimum symbol-position spacing.

In the device shown in FIG. 4 the cyclic counter 43 is controlled by the clock pulses cl from the pulse generator 42. However, alternatively the counter 43 can be controlled by clock pulses supplied by a fixed-frequency oscillator, the motor being controlled by means of phase-locked-loop techniques in such a way that the pulses generated by the pulse generator 43 are in synchronism with the clock pulses generated by the oscillator.

Figure 6A:
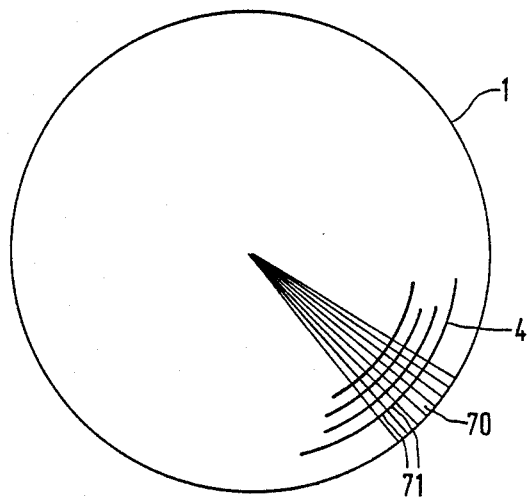

FIG. 6a shows an embodiment of the record carrier 1, which is divided into sectors 70, which are shown only partly in FIG. 6a. These sectors divide the tracks into the segments 71.

Figure 6B:
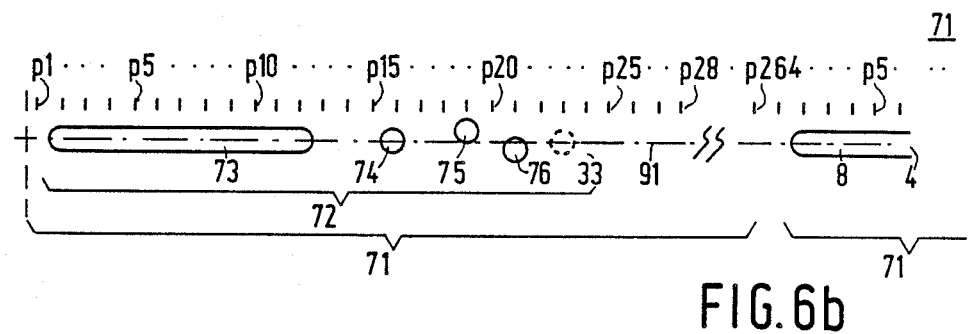

FIG. 6b shows one of the segments 71 to a strongly enlarged scale. Each segment comprises a fixed number of symbol positions. For the present record carrier this number is selected to be, for example, 264.

The portion of the track 4 comprising the symbol positions p1 to p24 contains a preformed optically detectable control symbol 72, comprising for example prerecorded pits. The control symbol and the code used for recording the information signal are adapted to one another in such a way that the pattern of prerecorded control marks 73, 74, 75 and 76 differs from the pattern of recording marks 8 formed when the information signal is recorded.

For example, if a code is selected for which the maximum length of the recording marks 8 to be formed is smaller than the prerecorded control mark 73, the control symbol 72 can always be distinguished from the pattern of recording marks 8 formed when the information signal is recorded.

For the purpose of controlling the write and read process control marks 74, 75 and 76 are formed. The manner in which the necessary control signals are derived from the control marks 74, 75 and 76 will be described in detail hereinafter.

Figures 7, 7A:
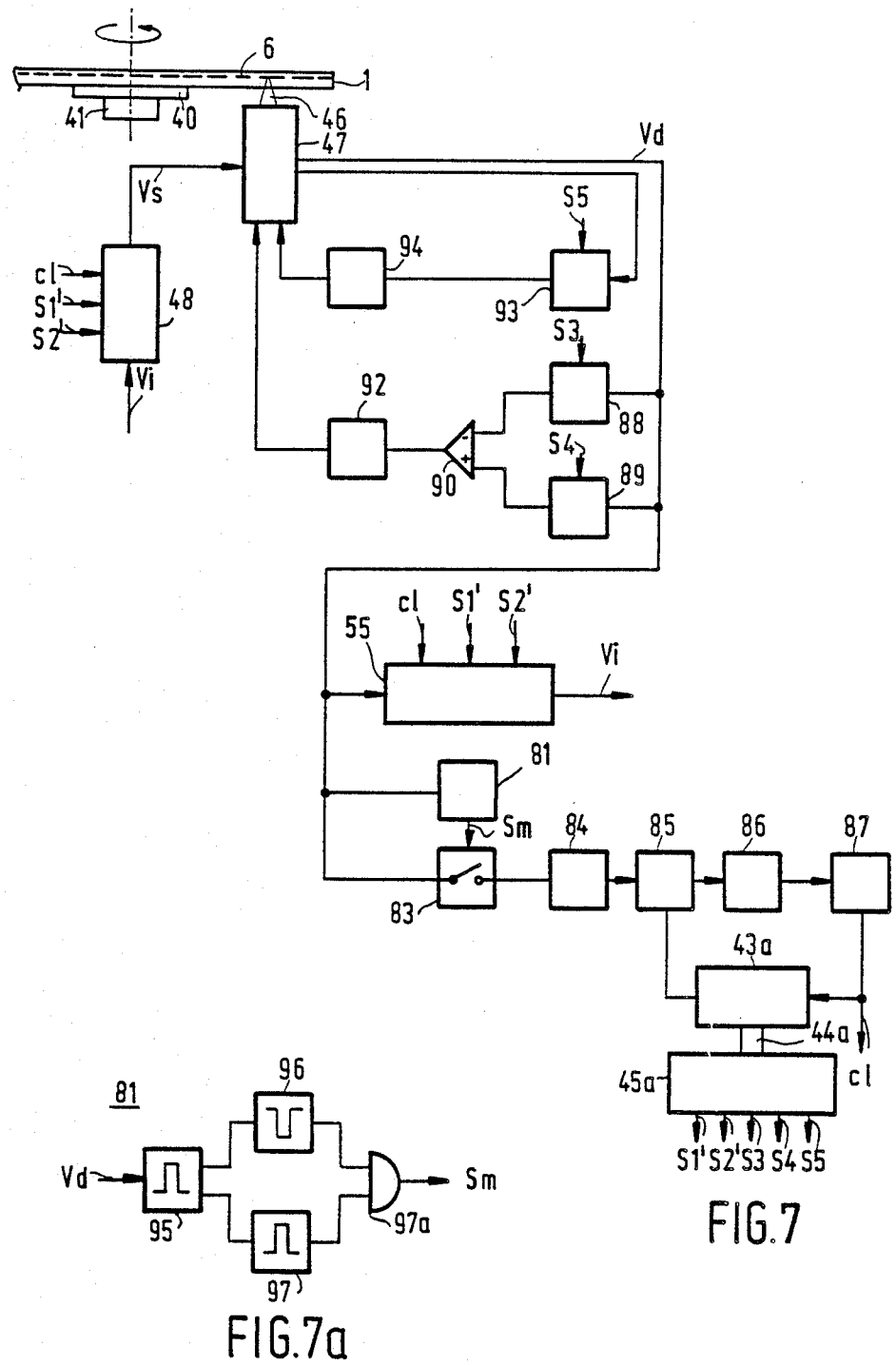
FIG. 7 and 7a show another embodiment of the write and read device.

FIG. 7 shows an embodiment of a write and read device in accordance with the invention for recording and reading an information signal on/from the record carrier shown in FIG. 6, wherein elements corresponding to the elements shown in FIG. 6 have the same reference numerals.

The detection signal Vd supplied by the write/read head 47 is applied to a detection circuit 81 for detecting the control marks 73, whose length corresponds to eleven symbol positions. The detector circuit 81, shown by way of example, comprises a level-sensitive retriggerable monostable multivibrator 95 which is retriggered each time that a low level appears on its trigger input, so that in the case of a sustained low-level signal on the trigger input the output signal of the multivibrator 95 remains "1". The monostable multivibrator 95 operates in such a way that after the level on the trigger input has changed from low to high the output signal remains "1" for a time interval corresponding to 11.5 symbol positions.

The output signal of the multivibrator 95 is applied to a monostable multivibrator 96 and a monostable multivibrator 97, which are responsive to a 1-0 transition in the output signal of the multivibrator 95 to generate a positive pulse and a negative pulse respectively. The positive and negative pulses are applied to an AND-gate 97a. The pulse durations of the positive and the negative pulses are selected in such a way that on the output of the AND gate 97 a control signal is produced during the time interval which includes at least the scanning of the control marks 74 at the symbol positions 16 and which at most include the scanning of the symbol positions p13 to p18. The control signal Sm on the output of the detector circuit 81 is applied to a control input of an electronic switch 83, which is responsive to the control signal to apply the detection signal Vd to a pulse shaper 84, for example a level-sensitive monostable multivibrator.

In this way a pulse is generated on the output of the pulse shaper 84 in response to the scanning of the control mark 74. This pulse is applied to a phase detector 85 of a phase-locked loop circuit, which further comprises a loop filter 86, a voltage controlled oscillator 87 and a frequency scaler divider in the form of a cyclic counter 43a, which every counting cycle supplies one pulse to the phase detector 85. The counter range of the counter 43a corresponds to the number of symbol positions within the track segments 71, so that the count of the counter 43a always indicates the instantaneously scanned symbol position within the track segment 71. The output signals of the counter 43a are applied to a gate circuit 45a via a bus 44a, which gate circuit derives five signals S1', S2', S3' and S4' from the count in the customary manner, in such a way that the signal S1' is "1" for the count which indicates that the symbol position p23 is scanned, the signal S2' is "1" for those counts which indicate that the symbol positions p25 to p264 are scanned, the signal S3 is "1" for the count which indicates that the symbol position p19 is scanned, the signal S4 is "1" for the count which indicates that the symbol position p21 is scanned and S5 is "1" for the count which indicates that the symbol position p14 is scanned.

In the same way as the write circuit is controlled by the signals S1, S2 and cl in the embodiment described with reference to FIG. 4, the read circuit 48 in the embodiment shown in FIG. 7 is controlled by the signals S1', S2', cl, the signal cl being the output signal of the oscillator 87.

Control of the read circuit 55 by the signals C1, S1' and S2' is also similar to control of the write circuit 55 by the signals cl1, S1 and S2 in the embodiment shown in FIG. 4.

The signals S3, S4 and S5 are used for determining the sampling instants for the sampled servo controls for the purpose of tracking and focussing.

The sampled servo control for tracking comprises a first (88) and a second (89) sample-and-hold circuit to which the detection signal Vd is applied. The outputs of the circuits 88 and 89 are respectively applied to the inverting input and the non-inverting input of a differential amplifier 90.

The circuit 88 is controlled by the signal S3, which indicates the scanning instant of the control mark 75 at symbol position p19.

The circuit 89 is controlled by the signal S4, which indicates the scanning instant of the control mark 76 at symbol position p21.

The control mark 75 is offset from the center 91 of the track 4. The control mark 76 is offset from the center 91 in the opposite direction.

The output signal on the output of the differential amplifier 90, which signal indicates the difference in the detection signal Vd at the scanning instants of the control marks 75 and 76, is consequently a measure of the tracking error.

The output signal is applied to a control circuit 92, which in a customary manner derives a control signal from the tracking error, which control signal is applied to the write/read head 47 to keep the beam 46 centred on the track 4 to be scanned.

The sampled servo control for keeping the radiation beam 46 in a focus on the layer 6 comprises a focus-error detection system of a customary type, for example an astigmatic focus-error detection system accommodated in the writehead 47, to generate the focus-error signal. The focus-error signal is applied to a sample-and-hold circuit 93, which is controlled by the signal S5, which indicates the instant at which a flat portion of the layer 6 at the location of the symbol position p14 is scanned. The output signal of the sample-and-hold circuit 93 is applied to a control circuit 94, which derives a control signal from the sampled focus-error signal to keep the beam 46 focussed on the layer 6.

The embodiment of the write and read device shown in FIG. 7, which combines the use of reference marks for determining the decision level with the use of the sampled servo systems and the use of circuits for deriving the clock signal from the control symbols 72, has the advantage that the pattern of recording marks 8 used for recording the information has no influence whatsoever on the generation of the clock signal, the tracking control, the focus control, and the derivation of the decision level. Thus the number of requirements to be imposed on the code is minimal, which means that code classes may be used which enable a very high information density to be achieved on the record carrier.

The invention has been described for a record carrier which is read in reflection, but it will be obvious that the invention may also be applied to record carriers read in transmission.

A suitable class of codes enabling a high information density to be obtained on the record carrier includes the codes in which the information signal is converted into code words comprising code bits, the number of code bits of a first logic value, for example "1", being variable, the number of successive bits of this logic value within the code word being at least equal to P, and the number of groups of at least P successive bits of the first logic value within each code word being separated from one another by at least Q successive bits of another logic value, Q being greater than P. Such a code word can be recorded by means of code symbols with a number of equidistant symbol positions equal to the number of bits of the code word, a bit of the first logic value being represented by an elementary mark 54 situated at a symbol position corresponding to the bit position within the relevant code word. At the symbol positions corresponding to the bit positions of bits of the second logic value "0" no elementary mark is formed.

Figure 8:
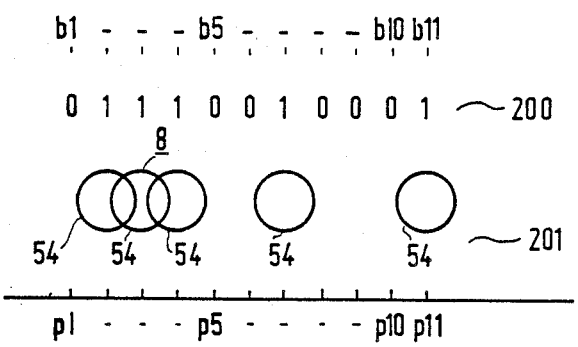
FIG. 8 shows an example of a code word and the associated pattern of recording marks used in the inventive method.

FIG. 8 shows, by way of example, for P is 1 and Q is 2 a possible code word 200 and a code symbol 201 recorded on the record carrier and corresponding to the code word 200. The "1" bits at bit positions b2, b3, b4, b7 and b11 are represented by elementary marks 54. As already described hereinbefore, the elementary marks can be formed with the aid of a radiation pulse. It is to be noted that at high information densities the diameter of the elementary mark 54 is greater than the spacing between the symbol positions.

Figure 9:
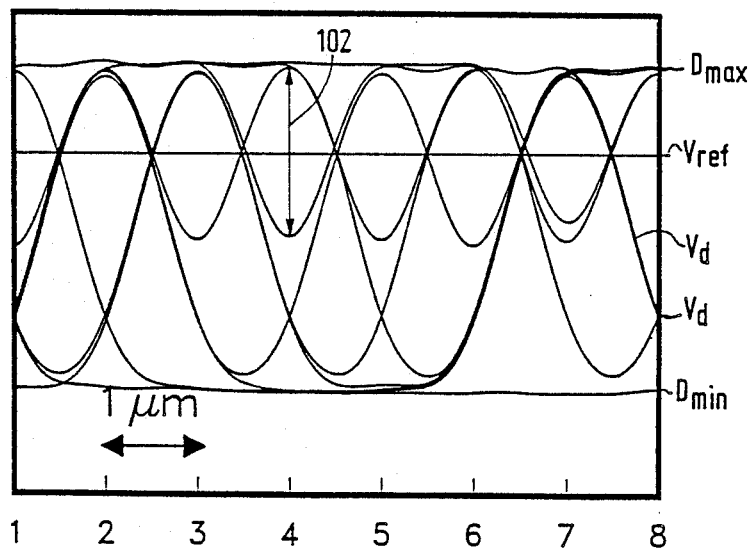
FIGS. 9 and 10 show eye patterns derived from the detection signal Vd for different spacings between the symbol positions, FIG. 11 gives the information densities obtained when different codes are used.

If the information densities for different codes are to be compared it is customary to compare the magnitudes of the smallest eye openings in the eye patterns obtained by means of the detection signal Vd. FIG. 9 shows such an eye opening for a detection signal Vd obtained if the information signal is recorded without being encoded. Such an eye pattern is obtained by recording different portions of the detection signal over one another in such a way that the phase relationship between the detection signal and the channel-clock signal is maintained. The most favourable instants for determining the logic value of a bit of the code word to be recovered are the instants at which the eye opening is maximal. These instants are indicated by the digits "1" to "8" in FIG. 9 and correspond to the instants at which the center of the scanning beam coincides with a symbol position. The time interval between these instants consequently corresponds to the spacing between the symbol positions. In FIG. 8 this spacing is approximately 1 $\mu$m.

To determine the logic value of each code bit the detection signal Vd is compared with the reference level Vref. This means that reliability of this process will decrease as the eye opening becomes smaller. The magnitude of the smallest eye opening in the eye pattern is a suitable criterion of the reliability (in FIG. 9 this is indicated by the arrow 102).

Figure 10:
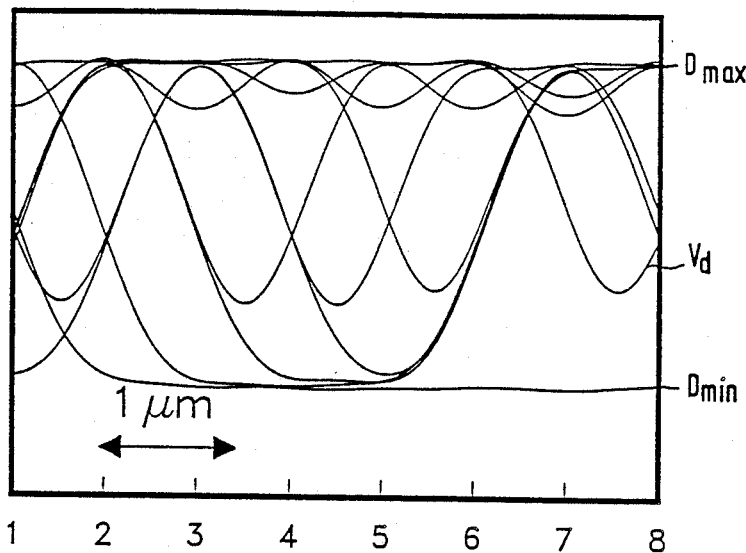

If the spacing between the symbol positions decreases, the information density increases, but the magnitude of the eye openings and hence the reliability decrease. By way of illustration FIG. 10 shows an eye pattern in the case that the spacing between the symbol positions has decreased by approximately 50 % in comparison with the situation in FIG. 9.

Figure 11:
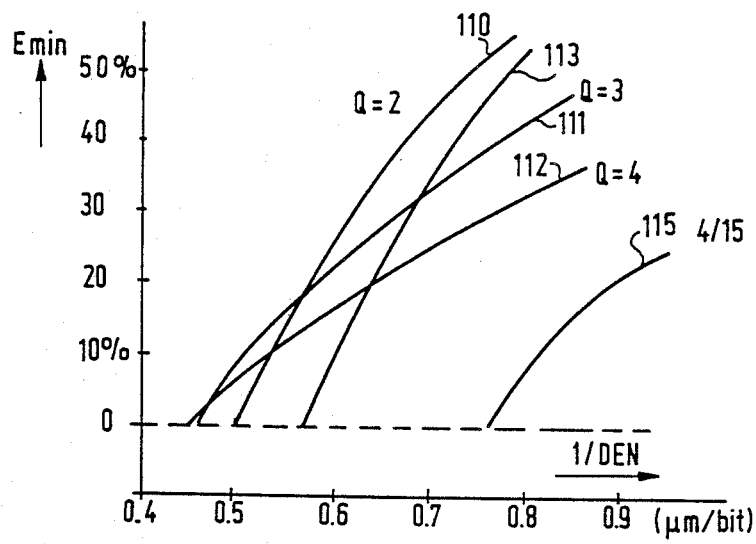

FIG. 11 shows the smallest eye openings Emin for a number of difference codes as a function of the inverse of the information density DEN.

The smallest eye opening that occurs is expressed has a percentage of the difference between the maximum signal strength Dmax and the minimum signal strength Dmin of the detection signal Vd. The information density is expressed as a number of $\mu$m occupied per bit of the information signal Vi.

Figure 12:
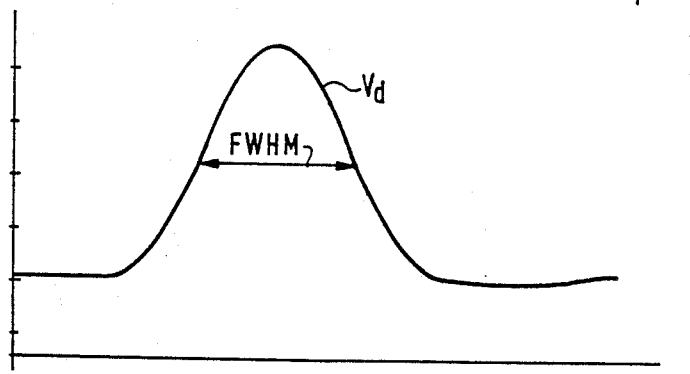
FIG. 12 shows the detection signal waveform obtained when an elementary mark is scanned.

The relationships given apply to the case that the FWHM value (full-width-half-maximum value) in the detection signal during scanning of a freely situated unitary mark corresponds to 1.0 $\mu$m. By way of illustration FIG. 12 shows the detection signal Vd obtained when the freely situated elementary mark 54 is scanned. In FIG. 12 the displacement of the radiation beam relative to the elementary mark 54 is plotted horizontally and the signal strength of the detection signal Vd is plotted vertically. The FWHM value indicates the distance between the points where the signal strength is half the maximum signal strength.

In FIG. 11 the curves 110, 111, and 112 illustrate the relationship between the smallest eye opening Emin and the information density for P is 1 and Q is 2, 3, and 4, respectively.

By way of illustration the curve 113 gives the relationship between the smallest eye opening and the information density if the information signal is recorded without being encoded. The curve 115 gives the information density in the case that the information words are encoded in conformity with the 4/15 code described in GB2,198,670.

From FIG. 11 it is evident that the class of codes described in the foregoing enable the information density to be increased substantially.

The curves given in FIG. 11 apply to the case that the code signal is encoded in an optimum manner, i.e. the ratio R between the number of information bits and the number of code bits is maximal. In the customary method of encoding, in which an information word with a constant number of bits, for example 8, is converted into a code word also having a constant number of bits, this ratio is smaller than said maximum value. This means that with such a code the attainable information density is lower than can be derived from FIG. 11. However, FIG. 11 is typical of the information densities attainable with the various codes in comparison with each other.

Figure 13I:
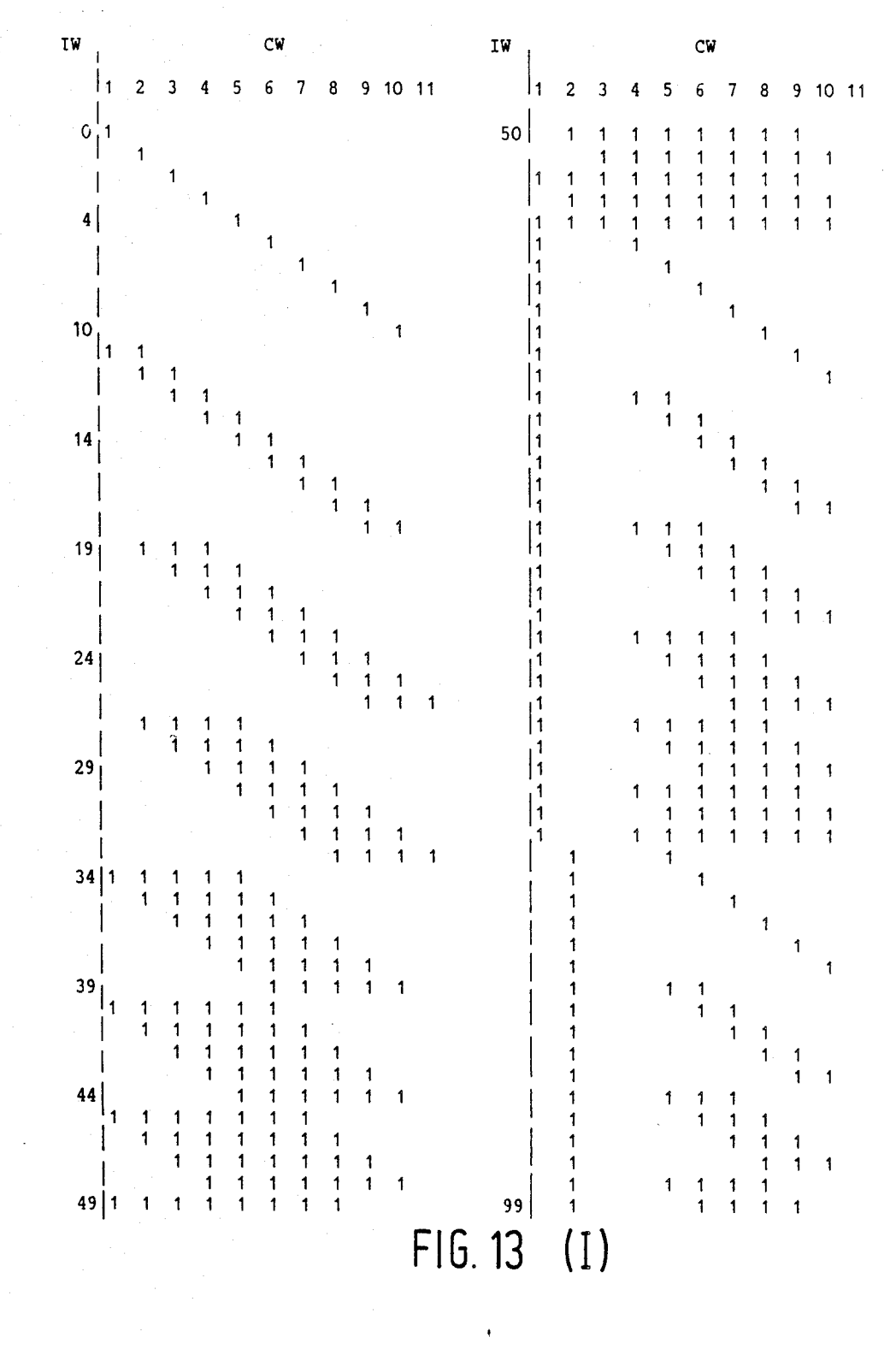
Figure 13III:
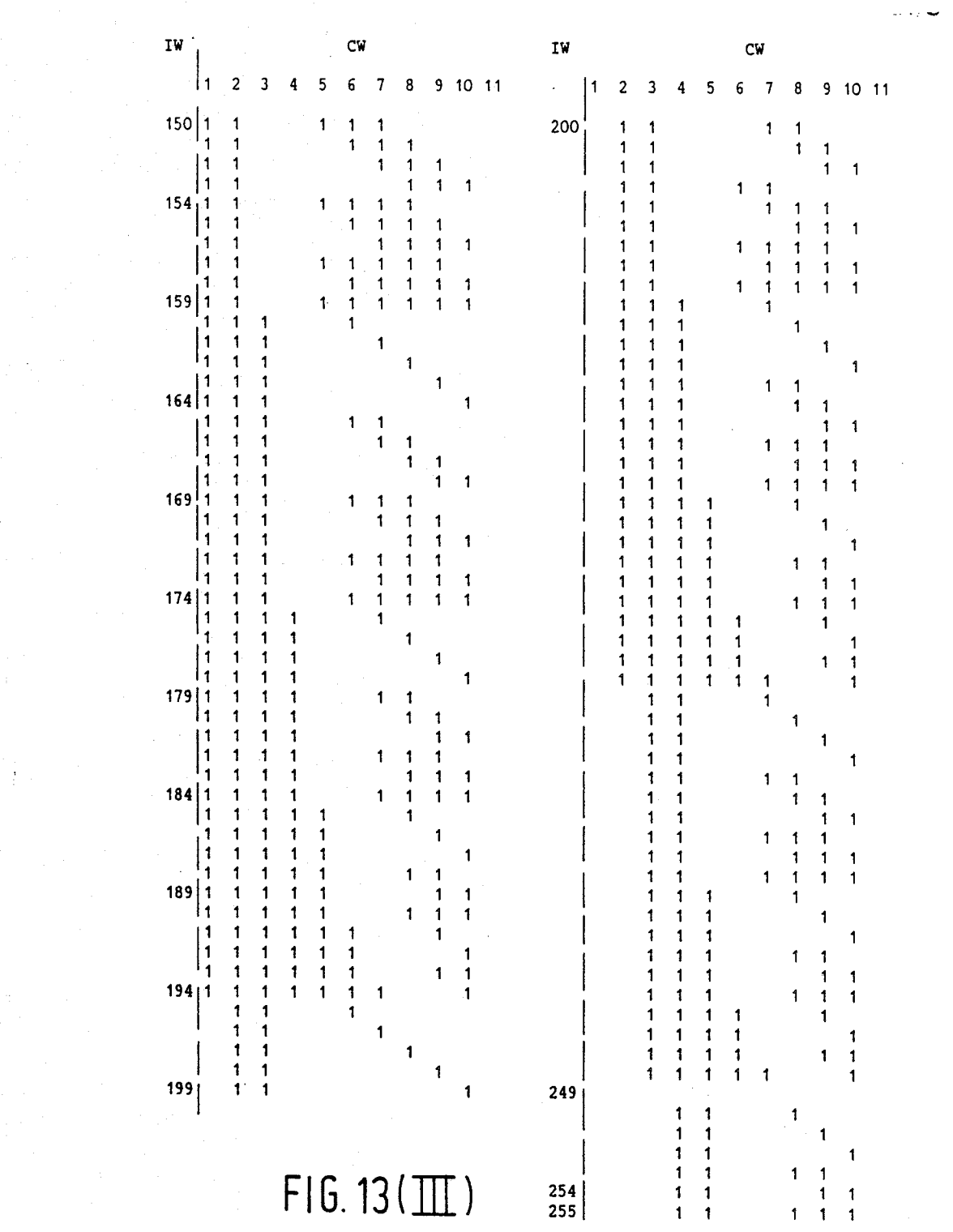

FIG. 13 shows an example of the relationship between 8-bit information words and 11-bit code words for P=1 and Q=2. The information words (IW) are given in the decimal system and the code words (CW) in the binary system. To each of the code words a merging bit of the logic value "0" is added, which is arranged at the end of each code word at bit position 11. Thus, for every random sequence of code words the bits of the logic value "0" in the portion corresponding to the first 10 bit-positions of each code word form part of a group of at least 2 successive bits of the logic value "0". This does not apply to the merging bit at bit position eleven, i.e. if in a code word the logic value of the bit at bit position ten is "1" and the next code word begins with a "1" bit. However, this need not be a problem because the merging bit always has the logic value "0", so that after reading the logic value of the merging bit may be ignored completely in the conversion of all the code words into information words.

Figure 14I:
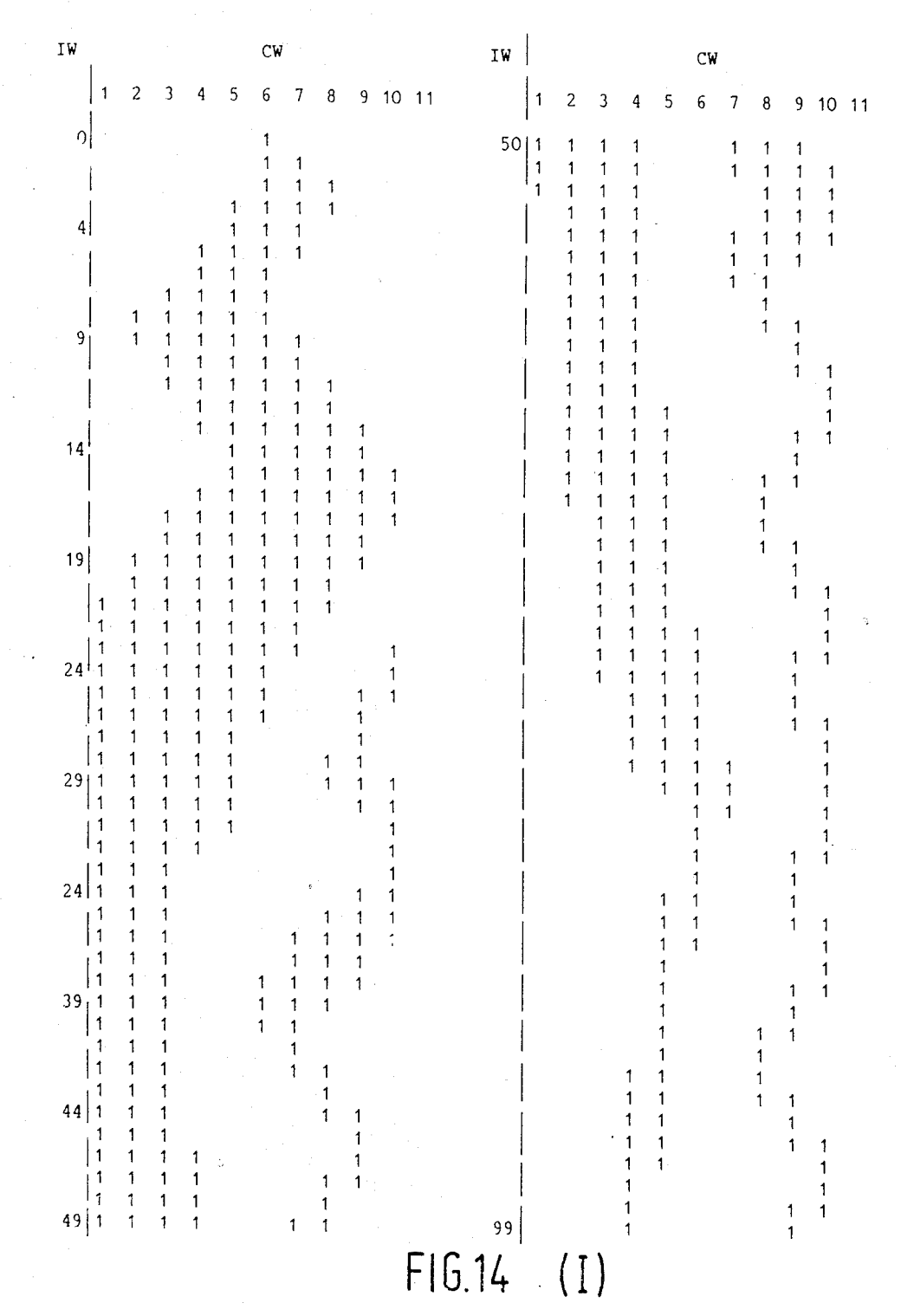
Figure 14II:
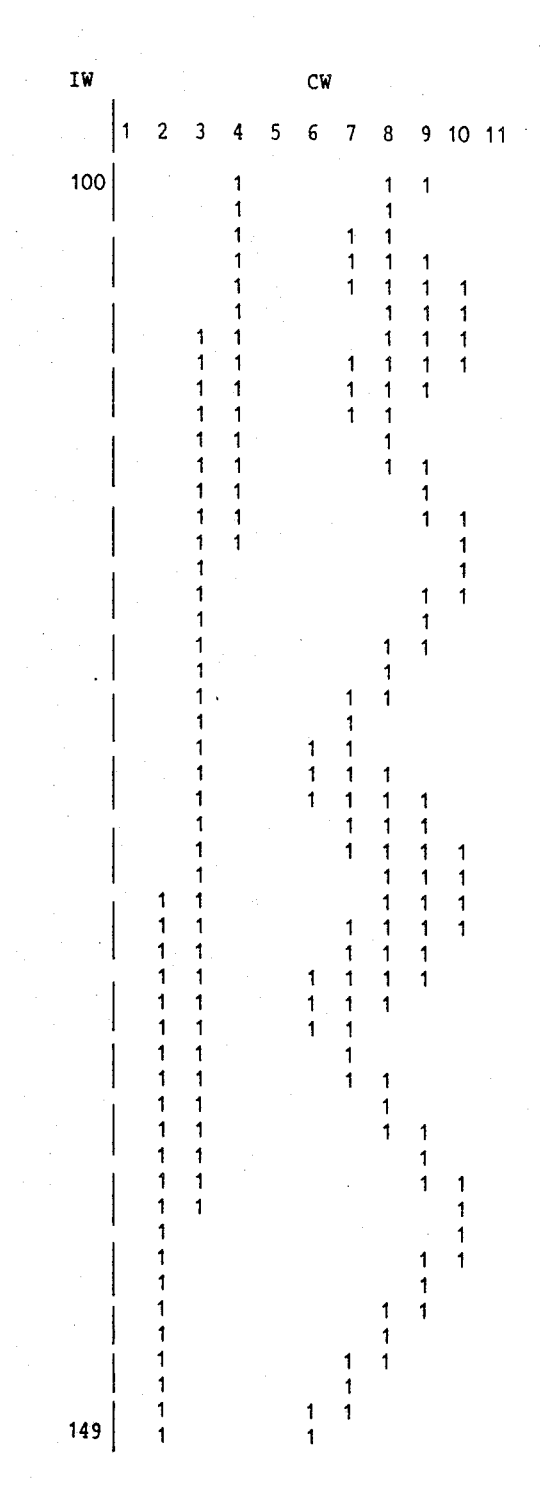
Figure 14III:
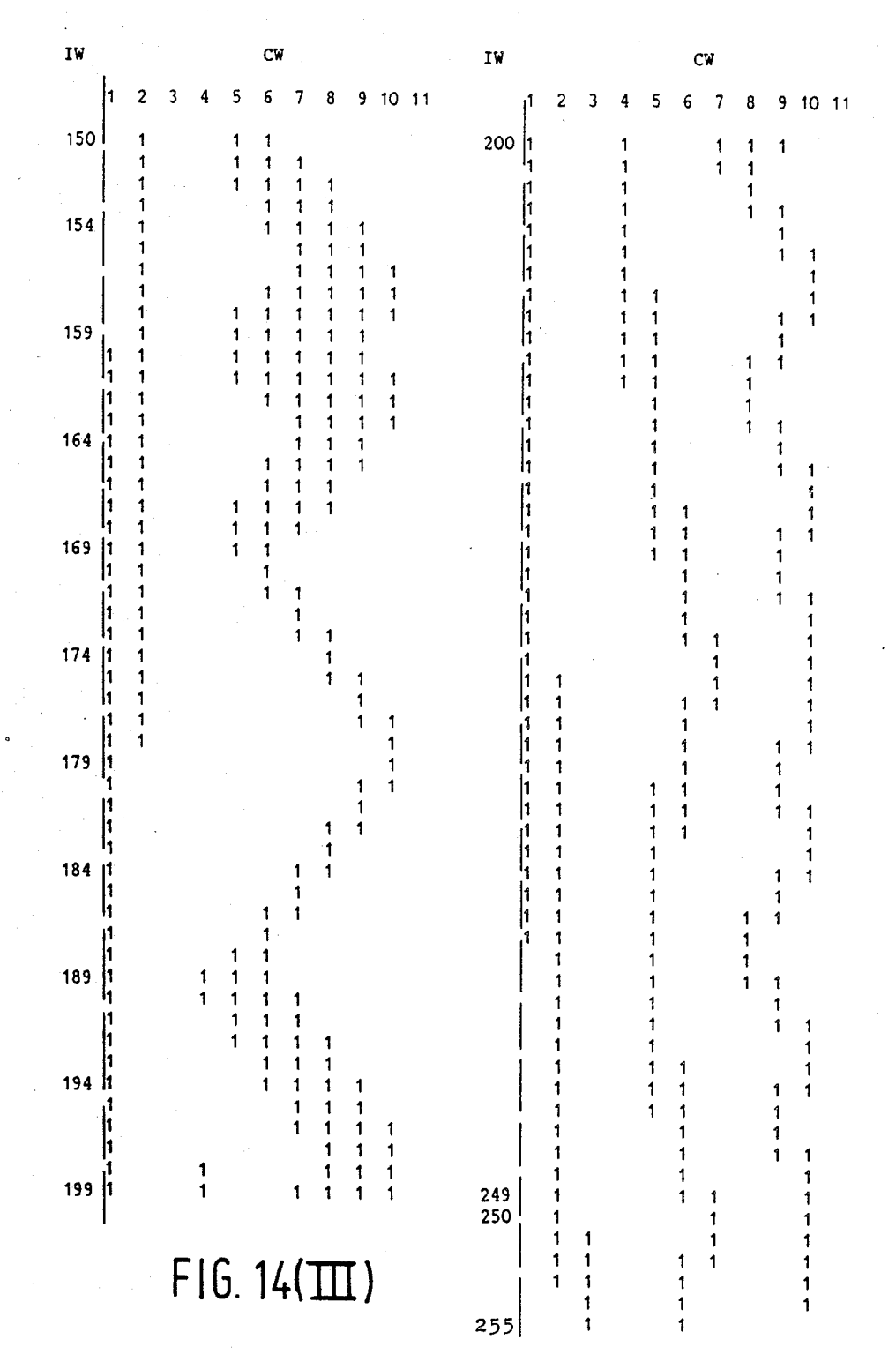

FIG. 14 shows another set of 11-bit code words for Q=2 and P=1, which code words have been selected in such a way that the number of "0" bits at the beginning of each code word and the number of "0" bits at the end of each code word is 5 at the most. Thus, the number of successive "0" bits in the code signal is 10 at the most. This has the advantage that an easy-to-detect control symbol can be employed, in the form of a control symbol comprising at least two recording marks between which more than ten unoccupied symbol positions are situated.

Moreover, the code words for information words of consecutive values differ by only one bit. Hereinafter, such a code will be referred to as a creeping code. Such a creeping code is of advantage if a record carrier is used on which track addresses are recorded as radially adjacent addresscode symbols. The effect of crosstalk from adjacent tracks during reading of the addresses with a radial movement of the read head is then minimal, which enables the track addresses to be read in a comparatively reliable manner during a radial displacement of the read head in order to locate selected tracks.

Figures 21A, 21B:
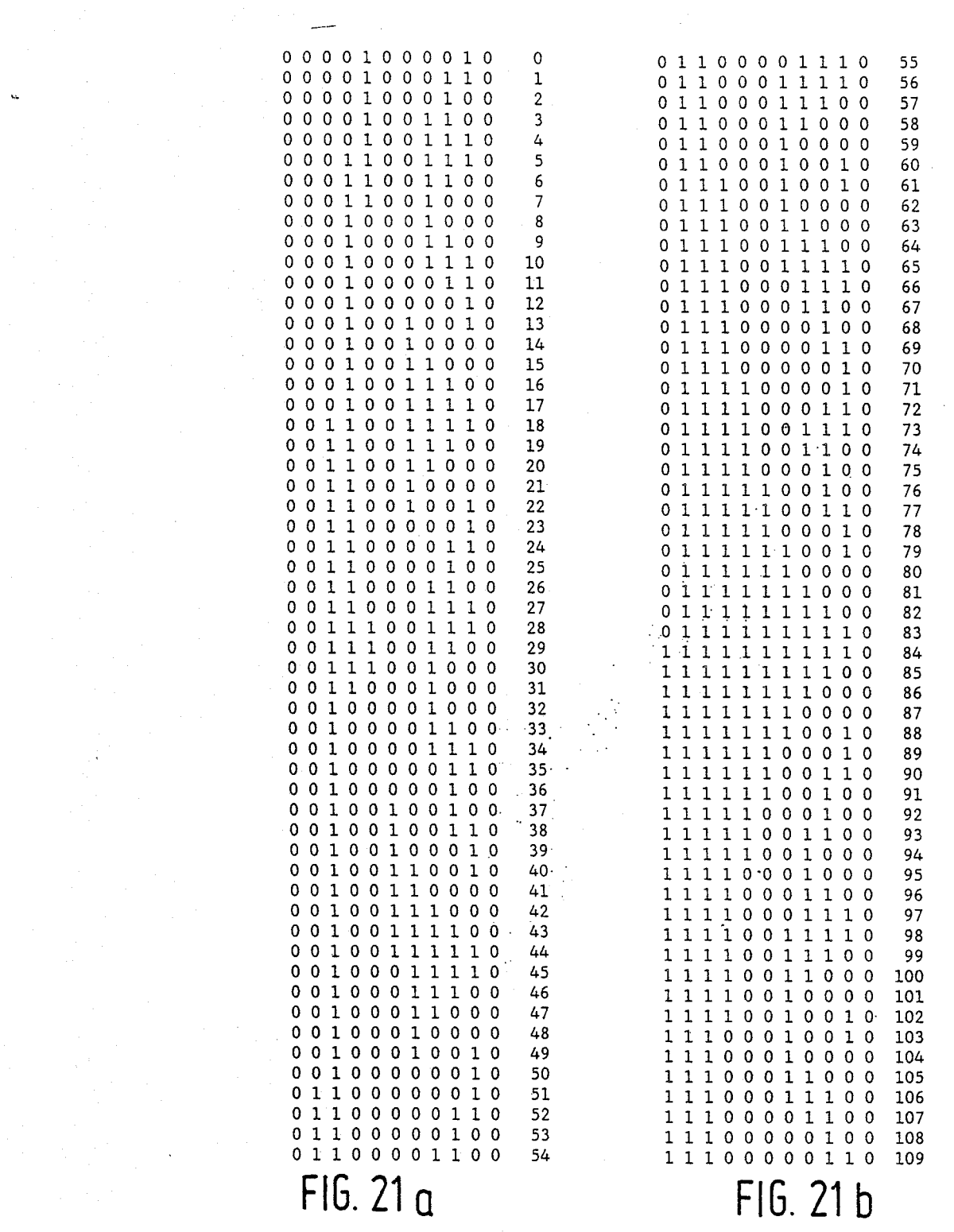
Figures 21C, 21D:
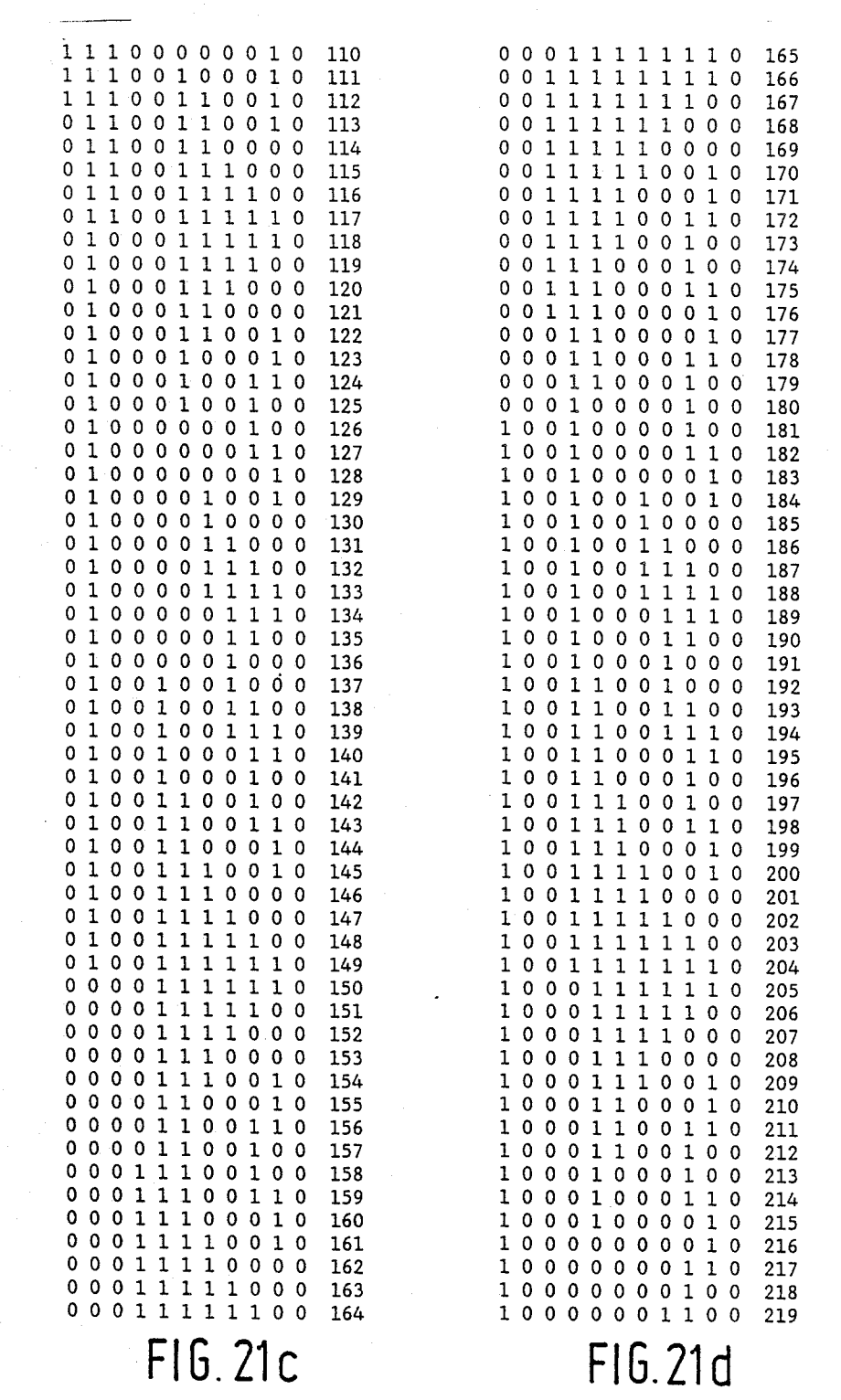
Figure 21E:
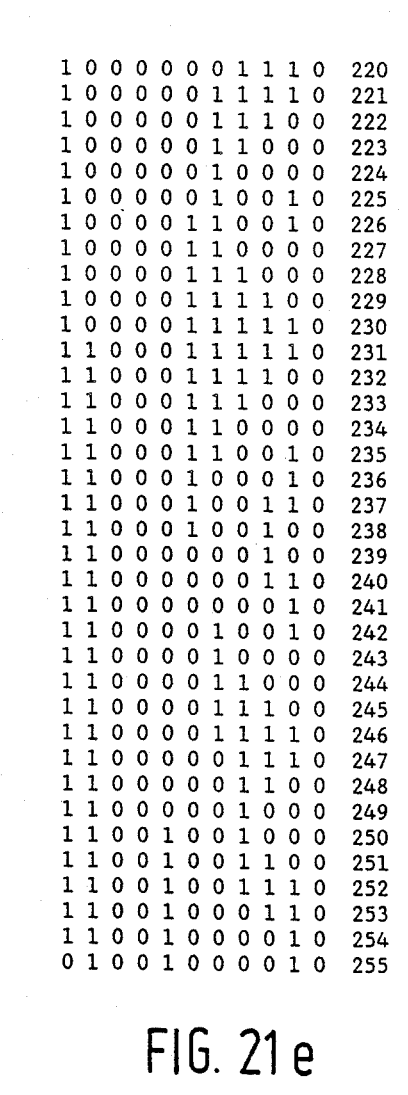

FIG. 21 gives another n-bit sequence of a creeping code for Q=2 and P=1, in which the number of "0" bits at the beginning and the end of the code is only four. In this code the maximum number of consecutive "0" bits in a sequence of successive code words is at the most equal to the maximum number (eight) of consecutive "0" bits in the code words. This enables a very short control symbol to be used.

Figure 18:
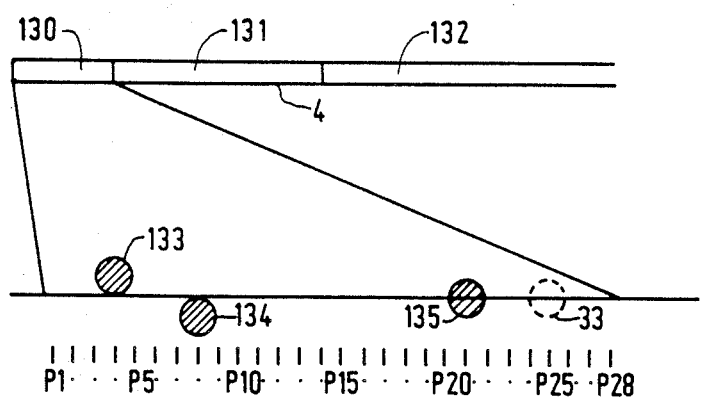
FIG. 18 shows an example of a control symbol.

FIG. 18 shows a prerecorded control symbol 130, which is suitable for use in conjunction with the creeping code given in FIG. 14. The control symbol 130 is followed by the address-information pattern 131 comprising a plurality of prerecorded code symbols of eleven symbol positions each, which each represent an address-code byte of the address. The address bytes are encoded in conformity with the code given in FIG. 14. The portion 132 of the track following the address-information pattern 131 is intended for data recording.

The control symbol 130 comprises two marks 133 and 134 which are offset from the track center for the purpose of tracking. A mark 135 situated at position p21 of the control symbol can be used for clock-signal regeneration for control purposes during recording and reading in a manner, similar to the mark 76 in FIG. 16. The number of unoccupied symbol positions between the mark 134 and the mark 135 is twelve, which is greater than the maximum number of successive unoccupied symbol positions (ten) in the information pattern, so that the control pattern can always be distinguished from the information pattern. The control symbol 130 can be detected in the same way as the control symbol shown in FIG. 6 by means of the detector circuit 81.

The area between the recording marks 134 and 135 can be used for focussing the radiation beam at the record carrier by means of a sampled focus control. The reference mark 33 for determining the decision level can be arranged at p25 within the control symbol 130.

Figure 20:
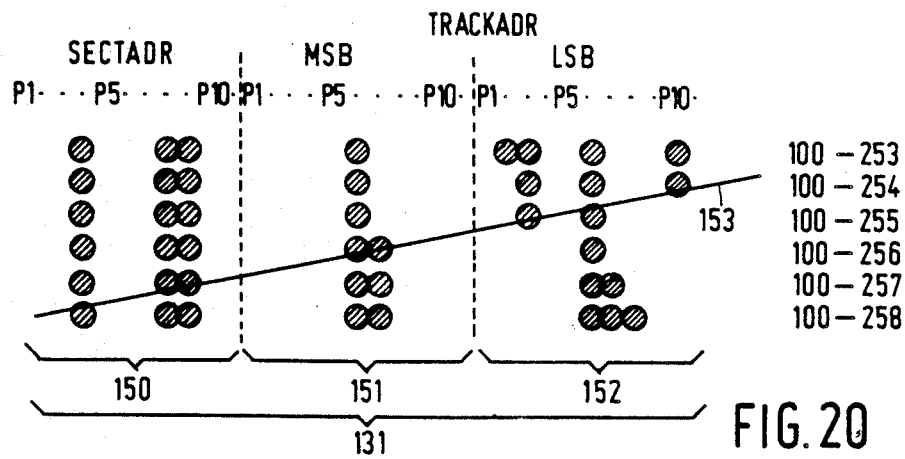
FIG. 20 shows a number of address-information patterns.

FIG. 20 shows the address-information patterns 131 of six tracks. Each address-information pattern comprises a first code symbol 150, which represents the sector address (SECTADR). The track address (TRACKADR) is represented by two successive code symbols 151 and 152, the code symbol 151 representing the most significant portion of the address and the code symbol 152 representing the least significant portion of the address.

For the address-information pattern shown the sector address is "100" and the track addresses range from "253" to "258". The address information is encoded in accordance with the code given in FIG. 14, so that the radially adjacent code symbols differ .at the most by one symbol position. During a radial displacement of the read head, when the scanning spot on the record carrier for example follows the path indicated by the line 153, the radial position of the scanning spot can be derived accurately from the address information recovered from the associated detection signal Vd. As a result of the minimal effect of crosstalk, the address can be read in a fairly reliable manner. If the radial velocity of the scanning spot is selected in such a way that the displacement does not cover more than two tracks for a distance of eleven symbol positions, the position can be determined with an accuracy of one track. Only in exceptional situations when the scanning spot traverses an area in which the most significant portion of the address changes, is it possible that the resulting read error corresponds to 256 tracks. However, these errors are so large that in general they can be detected from the manner in which the successive addresses change, after which these incorrectly read addresses may be ignored.

It is to be noted that the preformed recording marks constituting the address-information pattern 131 will generally be of a different type than the recording marks to be recorded subsequently by means of the read/write head 47, so that the decision level for the recovery of the recorded signal is not suitable for the recovery of the address information. However, the preformed recording mark 135 may serve as a reference mark to determine the decision level for the purpose of recovering the address-code words from the detection signal Vd.

Figure 19:
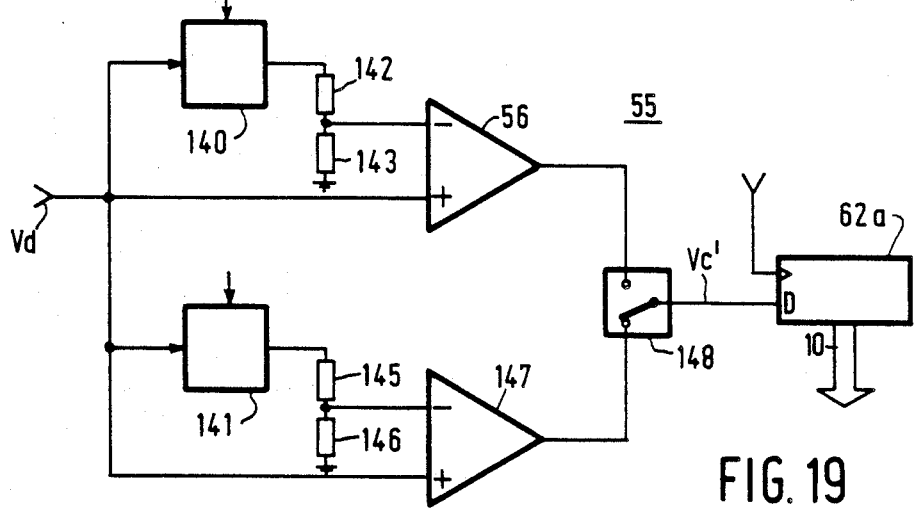
FIG. 19 shows an example of a read circuit.

FIG. 19 shows a modification of the read circuit 55, in which the decision levels for reading the prerecorded address information and for reading the information recorded by the user are determined independently of one another. The detection signal Vd is applied to a peak detector 141. The peak detector 140 is controlled by a control signal which represents a time window in which position p25 of the control symbol is scanned. The peak detectors 140 and 141 are of a type indicating the difference between the maximum and the minimum value of the detection signal within the time window. (Such peak detectors may comprise a minimum-level detector, a maximum level detector and a differential amplifier.) The reference signal representing the decision level Vref is derived by means of a voltage divider comprising the resistors 142 and 143. The reference signal is applied to the inverting input of the comparator 56. The peak detector 141 is controlled by a control signal which represents the time window in which the preformed recording mark 135 is scanned, so that the peak detector 141 detects the maximum difference occurring in the detection signal while the recording mark 135 is scanned. By means of a voltage divider comprising the resistors 145 and 146 the reference signal is derived, which reference signal represents the decision level Vref' necessary for reading the prerecorded address information. The reference signal is applied to the inverting input of a comparator 147.

The detection signal is applied to the inverting inputs of the comparators 56 and 147. The outputs of the comparators 156 and 147 are applied to the input of a two-input multiplex circuit 148. The multiplex circuit 148 is controlled by a control signal which indicates when the predetermined address-information pattern 131 following the control symbol 130 is scanned. Controlling is effected in such a way that during scanning of the address-information pattern 131 the output of the comparator 147 is coupled to the data input of the serial-parallel converter 62a. When the information pattern is scanned the output of the comparator 56 is coupled to the data input of the serial-parallel converter 62a, which ensures that the correct decision level is used for the recovery of the code signal. Again the code words loaded into the serial-parallel converter can be converted by means of a look-up table stored in a memory, whose address inputs are coupled to parallel outputs of the converter 62a. The circuits for generating the control signals for the peak detectors 140 and 141 and the multiplex circuit 148 are not shown in FIG. 19. However in the same way as the control signal for the read/write device shown in FIG. 7 they can be derived from the count of the cyclic counter 43a.

Figure 15I:
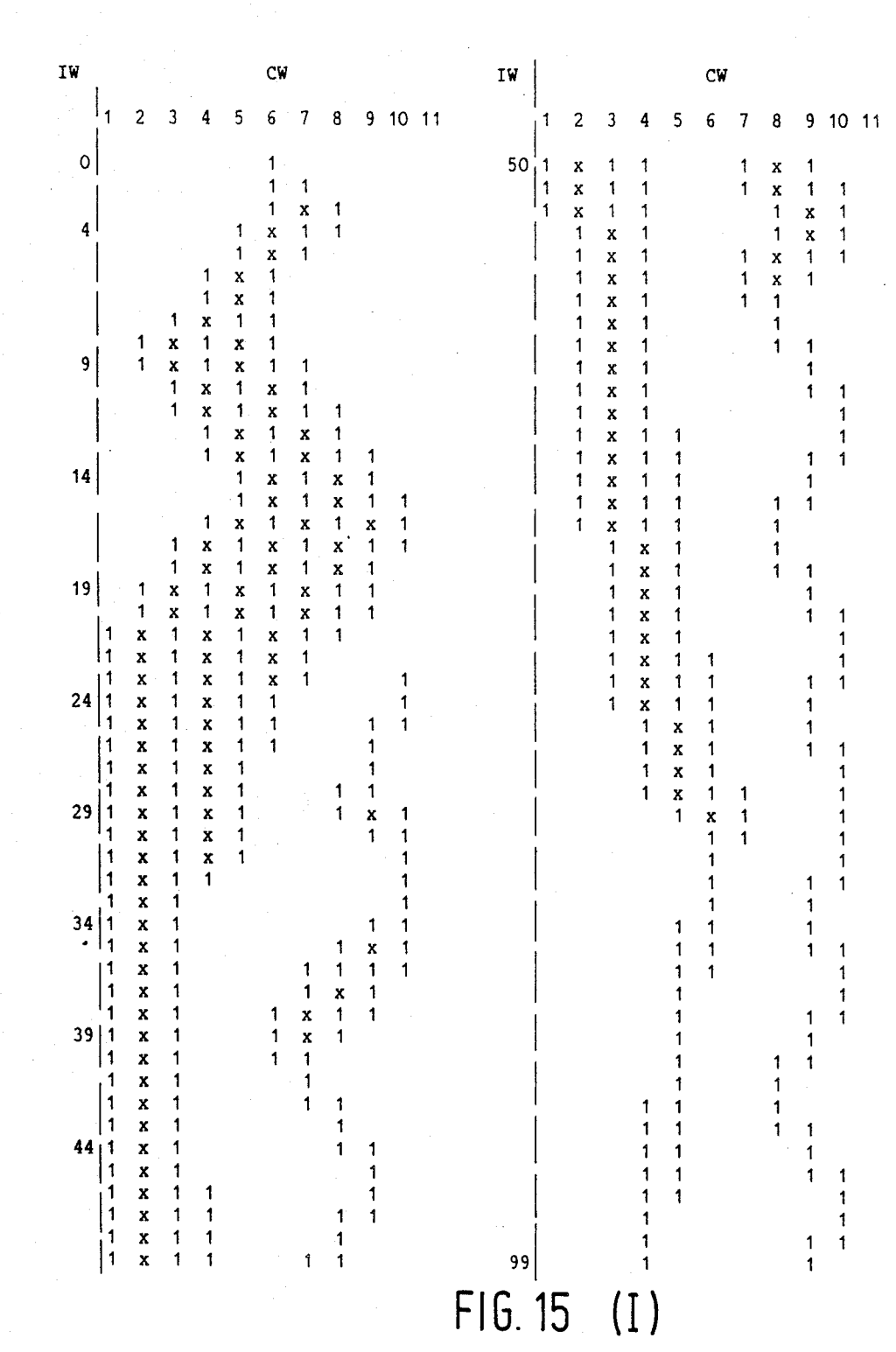
Figure 15II:
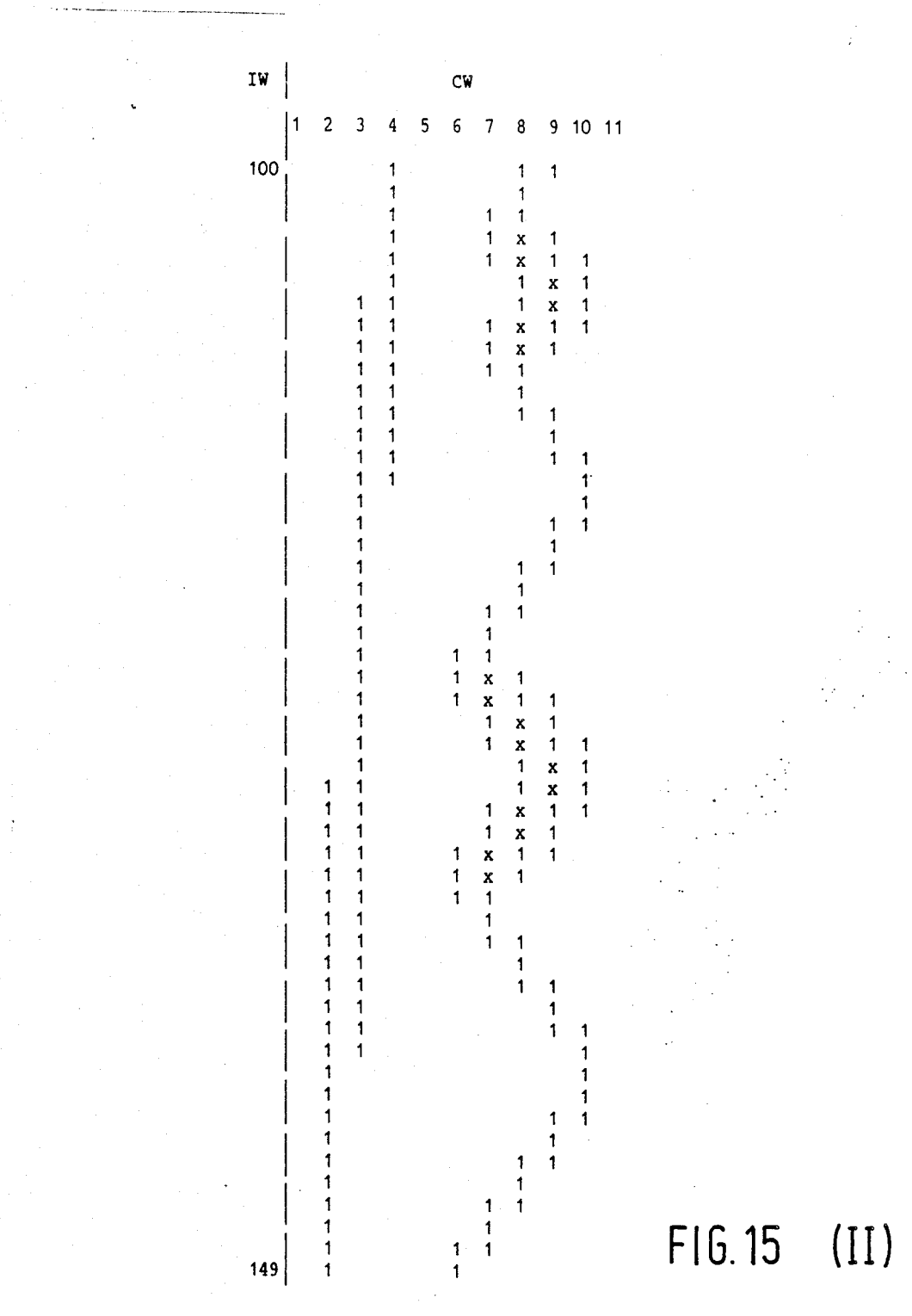

FIG. 15 shows a modification of the code given in FIG. 14. In this modified code a number of code-word bits are marked as "don't care bits" (by means of "X" marks). The number of successive "don't care" bits is T. The T successive "don't care" bits are bounded at both ends by a bit of logic value "1". For this modification code, for which Q is two, this means that the group of T successive "don't care" bits comprise only one bit. In fact, the logic value of the "don't care" bits does not represent any information, because by changing the logic value of the "don't care" bit it is not possible to form a code word which has already been assigned to another information word. Therefore, the associated information word can be recovered simply, regardless of the logic value of the "don't care" bit. By encoding these "don't care" bit as "0" bits, the number of radiation pulses during recording is reduced substantially, which results in a prolonged life of the radiation source.

Figures 16A, 16B:
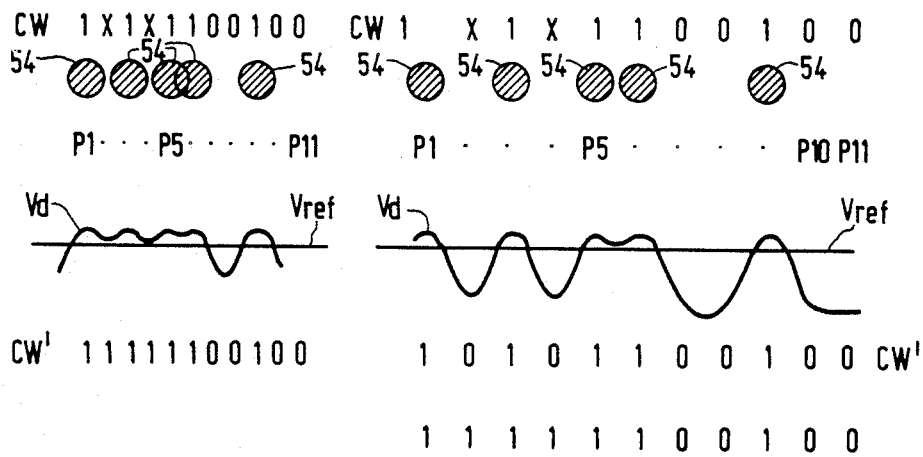

FIG. 16a shows the code symbol associated with the code word "1X1X1100100", which code symbol comprises elementary marks 54 and is recorded in a track situated near the center of the disc-shaped record carrier 1. The detection signal Vd obtained after reading and the code word recovered from the detection signal are also given in FIG. 16a. The "don't care" bits are read as bits of a logic value "1".

For the storage of data the angular velocity of the record carrier 1 during recording is maintained constant, which means that the spacing between the symbol positions increases as the distance from the track to the center of the record carrier increases.

FIG. 16b, for the same codeword CW as in FIG. 16a, gives the associated code symbol comprising elementary marks 54 in the case that the distance between the recording track and the record-carrier center is twice as large. The distance between the symbol positions is then also twice as large. The associated detection signal Vd and the code word CW' recovered from the detection signal are also given in FIG. 16b.

Since the spacing between the symbol positions has increased, the signal level for the detection signal Vd during scanning of the symbol positions p2 and p4 decreases below the reference level Vref; so that the "don't care" bits corresponding to these symbol positions are read as logic "0" bits.

The two different recovered code words CW of FIGS. 16a and 16b represent the same information word, so that during decoding both recovered code words CW must be converted into the same information word. This is possible, for example, by means of a memory in which a look-up table is stored, in which table the same information word, in the present case "27", is stored for both recovered code words CW'.

In another, more attractive, alternative the bit combinations "101" are converted into "111" (see FIG. 16b). The recovered code words thus converted can be converted into information words in a customary manner by means of a look-up table, in which each information word need be stored only once.

Figure 17:
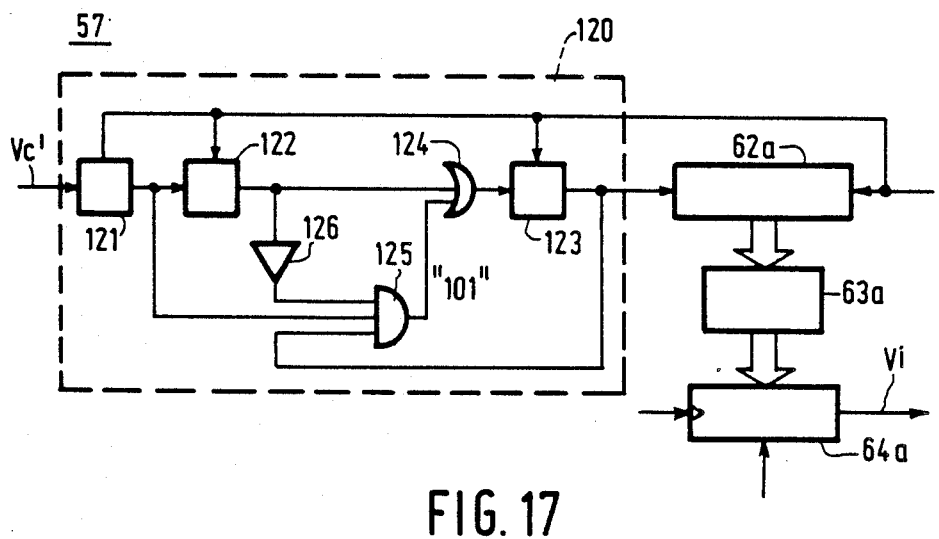
FIG. 17 shows an embodiment of a decoding circuit for use in a read device in accordance with the invention.

FIG. 17 shows an embodiment of the decoding circuit 57 in which the "101" combination in the code words is converted into "111" combinations.

For the serial-parallel converter 62a it is adequate to use a 10-bit shift register, because the merging bit at bit positions "11" may be ignored in decoding. The recovered code signal Vc' is applied to the converter 62a via a modification circuit 120. The modification circuit 120 comprises a 3-bit shift register comprising three clocked flip-flops 121, 122 and 123, for example D flip-flops. The recovered code signal Vc' is applied to the input of the first flip-flop 121. The output of the first flip-flop 121 is connected to the input for the flip-flop 122. The output of the flip-flop 122 is coupled to the input of the flip-flop 123 via an OR gate 124. The output of the flip-flop 123 is connected to the serial input of the serial-parallel converter 62a. The presence of the bit combination "101" in the flip-flops 121, 122 and 123 is detected by means of a three-input AND gate. For this purpose the first input of the AND gate is connected to the input of the flip-flop 121. A second input is connected to the output of the flip-flop 123. The output of the flip-flop 122 is coupled to the third input of the AND gate 125 via an inverter circuit 126. The output of the AND gate 125 is connected to an input of an AND gate 124. If the bit combination "101" is latched in the flip-flops 121, 122 and 123 the logic value of the output of the AND gate 125 will be "1". Upon the next clock pulse on the clock inputs of the flip-flops a "1" bit instead of a "0" bit is shifted out of the flip-flop 122 into the flip-flop 123. For all the other bit combinations in the flip-flops 121, 122 and 123 the output signal of the AND gate 125 is "0" so that upon the next clock pulse the content of the flip-flop 122 is loaded into the flip-flop 123. Thus, each bit combination "101" is changed to the bit combination "111". The recovered code signal thus modified is converted into the information signal Vi in the manner described in the foregoing by means of the serial-parallel converter 62a, the memory 63a and the parallel-serial converter 64a.

It will be evident that modification circuits similar to that shown in FIG. 17 for codes where Q is 2 can also be employed for codes with larger values of Q. For example if Q is 3, bit combinations "101" and "1001" must be detected in the recovered code signal Va' and must be converted into "111" and "1111".

In the embodiments described in the foregoing the decision level required for decoding is derived from the detection signal during scanning of reference marks. It is to be noted that if the parameters of the record carriers, in particular the reflection coefficient, are very constant, it is also possible to decode with a predetermined decision level. In the embodiments described in the foregoing the record carriers are read in reflection, but the invention can also be applied to record carriers to be read in transmission.

What is claimed is

1. A method of recording an information signal on a record carrier, an information signal being converted into a code signal comprising code words made up of bits, the number of successive bits of a first logic value within the code word being at least equal to P, the number of successive bits of the second logic value within each code word, which are situated between the groups of at least P bits of the first logic value, being at least equal to Q, P being an integer greater than or equal to 1 and Q being an integer greater than P, in which method an information pattern of recording marks corresponding to the code signal is formed on the record carrier, in which pattern the bits of the first logic value are represented by the recording marks, characterized in that the number of bits of the first logic value is code-word dependent, information words of consecutive values being converted into code words whose logic value is different for only one bit.

2. A method as claimed in claim 1, characterized in that the code words are selected in such a way that the number of successive bits of the second logic value at the boundaries is smaller than S/2, S being the number of code-word bits.

3. A method as claimed in claim 2, characterized in that Q is 2 and S is eleven, and in that the number of successive bits of the second logic value at both boundaries is four at the most, the number of bits of the second logic value at a predetermined boundary of the code-word being always greater than or equal to one.

4. A method for recording information on a record carrier, in which an information signal is converted into a code signal comprising code words made up of bits of a first logic value and bits of a second logic value, a pattern of recording marks corresponding to the code signal being formed on the record carrier, in which pattern bits of the first logic value are represented by the recording marks, characterized in that the code words are selected from a group of code words obtained in that in code words in which groups of P or more bits of the first logic value are separated by at least Q bits of the second logic value, groups of at the most T bits of the first logic value, which groups are bounded at both ends by P bits of the first logic value, are replaced by a group of T bits of the second logic value, P being an integer greater than or equal to 1, Q being an integer greater than P, and T being an integer smaller than Q.

5. A method as claimed in any one of the claims 1, 2, 3 or 4, characterized in that at retraceable positions on the record carrier and outside the area used for recording the information signal freely situated reference marks are formed, which reference marks are of the same type as the recording marks.

6. A method as claimed in claim 5, characterized in that the record carrier is provided with a preformed pattern of information tracks, the information track being provided with control symbols which can be distinguished from the pattern of recording marks to be formed, the reference marks being arranged at predetermined positions relative to the code symbols.

7. A device for recording information on a record carrier, which device comprises an encoding circuit for converting the information signal into a code signal comprising code words, the number of consecutive bits of a first logic value in each code word being at least equal to P, and the number of consecutive bits of a second logic value within each code word, situated between the groups of at least P bits of the first logic value, being at least equal to Q, where P is an integer greater than or equal to 1 and Q is an integer greater than P, the device comprising drive means for moving the record carrier relative to the write means, which are adapted to form an elementary mark in response to a bit of the first logic value, characterized in that the encoding circuit is adapted to generate code words with a variable number of bits of the first logic value, the logic values being different at only one bit position in the code words corresponding to information words of consecutive values.

8. A device as claimed in claim 7, characterized in that the encoding circuit is adapted to generate code words in which the number of consecutive bits of the second logic value is smaller than S/2, S being the number of code word bits.

9. A device as claimed in claim 8, characterized in that Q is 2 and S is 11, and in that the number of consecutive bits of the second logic value at both boundaries of the code words is four at the most and the number of bits of the second logic value at one of the predetermined boundaries of the code word is greater than or equal to one.

10. A device for recording information on a record carrier, which device comprises an encoding circuit for converting an information signal into a code signal comprising code words, which code words are made up of bits of a first logic value and bits of a second logic value, drive means for moving the record carrier relative to the write means, which write means are adapted to form an elementary mark in response to a code-word bit of a first logic value, characterized in that the encoding circuit is adapted to generate code words which belong to a group obtained in that in code words in which groups of P or more bits of the first logic value are separated by at least Q bits of the second logic value groups which comprise at the most T bits of the first logic value and which, in addition, are bounded at both ends by P bits of the first logic value are replaced by a group of T bits of the second logic value, P being an integer greater than or equal to 1, Q being an integer greater than P, and T being an integer smaller than Q.

11. A device as claimed in any one of the claims 7, 8, 9 or 10, characterized in that the device comprises means for temporarily interrupting the formation of code symbols and means for generating during said interruption control signals for the write head to form reference marks which are situated freely relative to the code signals.

12. A device as claimed in claim 11, in which the record carrier of a type whose information track is provided with preformed detectable code symbols which can be distinguished from the information patterns of recording marks to be formed, characterized by means for detecting instants at which the control symbols pass the write means, the device further comprising means responsive to the detection of the instants of passage the control symbols to interrupt the formation of the code symbols and to generate said control signals for forming the reference marks.

13. A device for reading a record carrier on which an information signal is recorded as an information pattern of recording marks, which device comprises read means for scanning the information pattern and for generating a detection signal which is representative of the pattern being scanned, means for converting the detection signal into a code signal comprising code words, which code words are made up of bits of a first logic value and bits of a second logic value, and a decoding circuit converting the code signal into an information signal, characterized in that the decoding signal is adapted to decode code words in which a bit pattern of a group which is bounded at both ends by P bits of a first logic value and which comprises at the most T consecutive bits of the second logic value, in a way identical to a code word in which said group of T bits of the second logic value is replaced by T bits of the first logic value and in which the logic values of the other bits are identical, T being an integer greater than or equal to 1.

14. A device as claimed in claim 13, characterized in that the decoding circuit comprises a modification circuit for modifying the code signal, for which purpose the modification circuit comprises detection means for detecting the presence of said groups of at the most T bits in the code words and means responsive to the detection of the presence of said group of at the most T bits to change the logic values of the bits of said group into the first logic value, the decoding circuit further comprising a code converter for converting the code words of the modified code signal into information words.

15. A record carrier provided with an information track in which information is recorded as an information pattern of recording marks, the information pattern comprising code symbols which represent code words, which code symbols have substantially equidistant symbol positions, a number of said positions being occupied by a recording mark, the number of consecutive occupied symbol positions being at least equal to P, the number of consecutive occupied symbol positions situated between the groups of at least P occupied symbol positions within the code symbols being at least equal to Q, P being an integer greater than or equal to 1 and Q being greater than P, characterized in that the number of occupied symbol positions is code-symbol dependent, in that the recorded carrier is provided with radially adjacent address-information patterns comprising code symbols, the radially adjacent code symbols of the information patterns being different for at the most one symbol position.

* * * * *